US008165022B2

(12) United States Patent
Toyokawa et al.

(10) Patent No.: US 8,165,022 B2
(45) Date of Patent: Apr. 24, 2012

(54) TRANSMITTING/RECEIVING METHOD AND PROGRAM AND RECORDING MEDIUM

(75) Inventors: Suguru Toyokawa, Tokyo (JP); Tohru Sugayama, Tokyo (JP); Hisao Kumia, Ichikawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 656 days.

(21) Appl. No.: 11/915,714

(22) PCT Filed: May 23, 2006

(86) PCT No.: PCT/JP2006/310205
§ 371 (c)(1),
(2), (4) Date: Nov. 27, 2007

(87) PCT Pub. No.: WO2006/132080
PCT Pub. Date: Dec. 14, 2006

(65) Prior Publication Data
US 2009/0279451 A1     Nov. 12, 2009

(30) Foreign Application Priority Data

Jun. 8, 2005  (JP) .................................. 2005-168285
Jan. 16, 2006  (JP) ................................ 2006-007224

(51) Int. Cl.
H04J 1/16  (2006.01)
(52) U.S. Cl. .......................... 370/230; 370/252; 370/352
(58) Field of Classification Search .................. 370/230, 370/235, 236, 252, 229, 352–356
See application file for complete search history.

(56) References Cited

U.S. PATENT DOCUMENTS 6,667,956 B2 * 12/2003 Beshai et al. ................. 370/238
(Continued)

FOREIGN PATENT DOCUMENTS

| JP | 2004-528764 A | 6/2004 |
| JP | 2005-72759 A | 3/2005 |
| JP | 2005-072759 A | 3/2005 |
| JP | 2005-244525 A | 9/2005 |
| WO | WO 02/080452 A2 | 10/2002 |
| WO | WO 2006/057381 A1 | 6/2006 |
| WO | WO 2006/129600 A1 | 12/2006 |

OTHER PUBLICATIONS

Hata et al., "Design and Implementation of Association Layer for Transparent Mobility in Multi-Homing Environment", IEICE Technical Report, (IN2003-261). vol. 103, No. 692, Mar. 5, 2004, pp. 53-57.

(Continued)

*Primary Examiner* — Chirag Shah
*Assistant Examiner* — Jay P Patel
(74) *Attorney, Agent, or Firm* — Birch, Stewart, Kolasch & Birch, LLP

(57) ABSTRACT

The present invention provides a transmitting/receiving method capable of selecting a combination of communication media of the own and its counterpart reflecting the preference of the user or an application for each of flows on communication terminals and capable of doing execution without being known by counterpart the preference information. It presents means for selecting a combination of CoAs (the CoA of the communication counterpart and that of the own) of the Mobile IP referring to the preference information of the application when communication terminals transmit/receive one or more flows (data flows) through one or more paths (communication channels). In consideration of combinations of flows and paths, the score is calculated for the combinations, and transmitted to the counterpart terminal of the communication, the approval is obtained to select the optimum path. As a result, the CoA suitable to the preferences of both parties can be selected for each flow.

18 Claims, 54 Drawing Sheets

U.S. PATENT DOCUMENTS

| | | | |
|---|---|---|---|
| 6,934,752 B1* | 8/2005 | Gubbi | 709/225 |
| 7,218,610 B2* | 5/2007 | Sivakumar et al. | 370/230 |
| 7,450,502 B1* | 11/2008 | Croak et al. | 370/230 |
| 7,450,513 B2* | 11/2008 | Okamura et al. | 370/235 |
| 7,474,642 B1* | 1/2009 | Chheda | 370/329 |
| 7,542,481 B2* | 6/2009 | Faccin et al. | 370/469 |
| 7,626,496 B1* | 12/2009 | Asher | 340/531 |
| 2004/0179515 A1* | 9/2004 | Kamani et al. | 370/352 |
| 2005/0058068 A1* | 3/2005 | Ben Ali et al. | 370/230 |
| 2005/0152397 A1* | 7/2005 | Bai et al. | 370/468 |
| 2006/0239271 A1* | 10/2006 | Khasnabish et al. | 370/395.21 |
| 2007/0147240 A1* | 6/2007 | Benveniste | 370/230 |
| 2007/0159972 A1* | 7/2007 | Lanzinger et al. | 370/230 |
| 2007/0173256 A1* | 7/2007 | Laroia et al. | 455/436 |
| 2007/0201409 A1* | 8/2007 | Kandlur et al. | 370/338 |
| 2007/0223469 A1* | 9/2007 | Chandra et al. | 370/389 |
| 2008/0280623 A1* | 11/2008 | Danne et al. | 455/453 |
| 2009/0125631 A1* | 5/2009 | Blom et al. | 709/228 |
| 2009/0175188 A1* | 7/2009 | Hardy et al. | 370/252 |

OTHER PUBLICATIONS

Wakikawa, "Multiple Care-of Addresses Registration", (http://tools.ietf.org/id/draft-ietf-monami6-multiplecoa-03.txt), (2007), pp. 1-40.

Hata et al., "Ido Tokasei o Jitsugen suru Association-so no Sekkei to Jisso", IEICE Technical Report, (IN2003-261). vol. 103, No. 692, Mar. 5, 2004, pp. 53-57.

* cited by examiner

|  | Dst Addr | Src Addr | Dst Port | BW(min) | BW(max) |
|---|---|---|---|---|---|
| FLOW 1 | IP10 | IP11 | 7080 | 8k *1 | 64k *3 |
| FLOW 2 | IP11 | IP10 | 7080 | 8k *1 | 64k *3 |

(B)

|  | TERMINAL | CoA | BW(UPSTREAM) | BW(DOWNSTREAM) |
|---|---|---|---|---|
| NIC100 | 10 | IP100 | 11M | 11M |

(C)

|  | Dst Addr | Src Addr | BW (MEASURED) | Dst NIC | Src NIC |
|---|---|---|---|---|---|
| PATH 1 | IP10 | IP11 |  | NIC100 | NIC110 |
| PATH 2 | IP10 | IP11 |  | NIC100 | NIC111 |
| PATH 3 | IP11 | IP10 |  | NIC110 | NIC100 |
| PATH 4 | IP11 | IP10 |  | NIC111 | NIC100 |

(D)

|  | TERMINAL | CoA | BW(UPSTREAM) | BW(DOWNSTREAM) |
|---|---|---|---|---|
| NIC100 | 10 | CoA100 | 11M | 11M |
| NIC110 | 11 | CoA110 | 11M | 11M |
| NIC111 | 11 | CoA111 | 200k | 30M |

FIG.4

| | Dst Addr | Src Addr | BW (MEASURED) | Dst NIC | Src NIC |
|---|---|---|---|---|---|
| PATH 1 | IP10 | IP11 | 300k | NIC100 | NIC110 |
| PATH 2 | IP10 | IP11 | 500k | NIC100 | NIC111 |
| PATH 3 | IP11 | IP10 | 150k | NIC110 | NIC100 |
| PATH 4 | IP11 | IP10 | 80k | NIC111 | NIC100 |

| | FLOW 1 | FLOW 2 |
|---|---|---|
| PATH 1 | 64k | - |
| PATH 2 | 64k | - |
| PATH 3 | - | - |
| PATH 4 | - | - |

(B)

| | FLOW 1 | FLOW 2 |
|---|---|---|
| PATH 1 | - | - |
| PATH 2 | - | - |
| PATH 3 | - | 64k |
| PATH 4 | - | 8k |

| | FLOW 1 | SCORE |
|---|---|---|
| COMBINATION 1 | PATH 1 | 400 |
| COMBINATION 2 | PATH 2 | 400 |

(B)

| | FLOW 2 | SCORE |
|---|---|---|
| COMBINATION 1 | PATH 3 | 400 |
| COMBINATION 2 | PATH 4 | 360 |

| DstAddr, DstPort | SrcIf | DstIf |
|---|---|---|
| IP11:7080(FLOW 2) | NIC100 | NIC110 |

(B)

| DstAddr, DstPort | SrcIf | DstIf |
|---|---|---|
| IP10:7080(FLOW 2) | NIC110 | NIC100 |

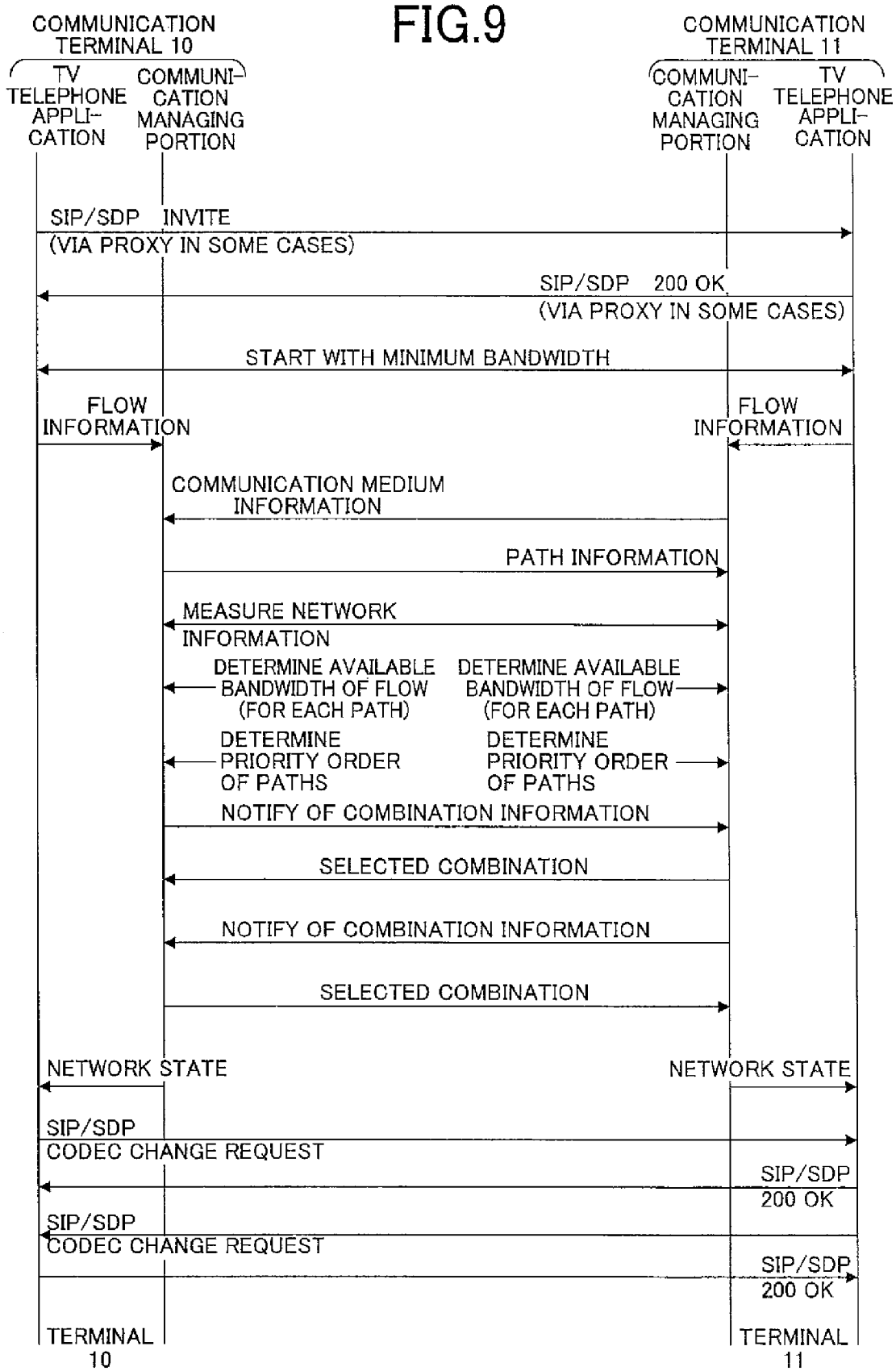

| | Dst Addr (HoA) | Src Addr (HoA) | Dst Port | BW1 | BW2 | BW3 | DELAY DIFFERENCE | COST (UPSTREAM) | COST (DOWNSTREAM) | STABILITY | MOBILITY |
|---|---|---|---|---|---|---|---|---|---|---|---|
| FLOW 10-1 | IP10 | IP11 | 7080 | — | — | — | — | Min *1 | — | — | — |
| FLOW 10-2 | IP10 | IP11 | 9080 | — | — | — | — | Min *5 | — | — | — |
| FLOW 11-1 | IP11 | IP10 | 7080 | 8k Must | 64k *4 | — | Min *5 | — | *0 | Max *1 | Max *1 |
| FLOW 11-2 | IP11 | IP10 | 9080 | 0k *0 | 100k *3 | 500k *2 | *0 | — | Min *5 | Maxk *1 | Maxk *1 |

(B)

| | Dst Addr (HoA) | Src Addr (HoA) | Dst Port | BW1 | BW2 | BW3 | DELAY DIFFERENCE | COST (UPSTREAM) | COST (DOWNSTREAM) | STABILITY | MOBILITY |
|---|---|---|---|---|---|---|---|---|---|---|---|
| FLOW 10-1 | IP10 | IP11 | 7080 | 8k Must | 64k *5 | — | Min *4 | — | *0 | Max *1 | Max *1 |
| FLOW 10-2 | IP10 | IP11 | 9080 | 0k *0 | 100k *3 | 500k *2 | *0 | — | Min *3 | Max *1 | Max *1 |
| FLOW 11-1 | IP11 | IP10 | 7080 | — | — | — | — | Min *1 | — | — | — |
| FLOW 11-2 | IP11 | IP10 | 9080 | — | — | — | — | Min *5 | — | — | — |

| | HoA | CoA | BW (UPSTREAM) | BW (DOWNSTREAM) | MOBILITY |
|---|---|---|---|---|---|
| NIC110 | IP11 | CoA110 | 11M | 11M | B |
| NIC111 | IP11 | CoA111 | 200k | 30M | A |

(B)

| | Dst Addr | Src Addr | Dst NIC | Src NIC | BW (MEASURED) | RTT DELAY DIFFERENCE | COST (UPSTREAM) | COST (DOWNSTREAM) | STABILITY | MOBILITY |
|---|---|---|---|---|---|---|---|---|---|---|
| PATH 1 | IP10 | IP11 | NIC100 | NIC110 | | | | | | |
| PATH 2 | IP10 | IP11 | NIC100 | NIC111 | | | | | | |
| PATH 3 | IP10 | IP11 | NIC101 | NIC110 | | | | | | |
| PATH 4 | IP10 | IP11 | NIC101 | NIC111 | | | | | | |
| PATH 5 | IP11 | IP10 | NIC110 | NIC100 | | | | | | |
| PATH 6 | IP11 | IP10 | NIC110 | NIC101 | | | | | | |
| PATH 7 | IP11 | IP10 | NIC111 | NIC100 | | | | | | |
| PATH 8 | IP11 | IP10 | NIC111 | NIC101 | | | | | | |

(C)

| | HoA | CoA | BW (UPSTREAM) | BW (DOWNSTREAM) | MOBILITY |
|---|---|---|---|---|---|
| NIC100 | IP10 | CoA100 | 11M | 11M | B |
| NIC101 | IP10 | CoA101 | 1M | 54M | A |
| NIC110 | IP11 | CoA110 | 11M | 11M | B |
| NIC111 | IP11 | CoA111 | 200k | 30M | A |

| | Dst Addr | Src Addr | Dst NIC | Src NIC | BW (MEASURED) | RTT DELAY DIFFERENCE | COST (UPSTREAM) | COST (DOWNSTREAM) | STABILITY | MOBILITY |
|---|---|---|---|---|---|---|---|---|---|---|
| PATH 1 | IP10 | IP11 | NIC100 | NIC110 | 5M | 30 | — | 0 | A | B |
| PATH 2 | IP10 | IP11 | NIC100 | NIC111 | 100k | 0 | — | 0 | C | B |
| PATH 3 | IP10 | IP11 | NIC101 | NIC110 | 7M | 50 | — | 20 | B | B |
| PATH 4 | IP10 | IP11 | NIC101 | NIC111 | 120k | 60 | — | 20 | A | A |
| PATH 5 | IP11 | IP10 | NIC110 | NIC100 | 4M | 0 | 0 | — | A | B |
| PATH 6 | IP11 | IP10 | NIC110 | NIC101 | 500k | 20 | 20 | — | B | B |
| PATH 7 | IP11 | IP10 | NIC111 | NIC100 | 6M | 40 | 0 | — | B | B |
| PATH 8 | IP11 | IP10 | NIC111 | NIC101 | 600k | 40 | 20 | — | A | A |

(B)

| | Dst Addr | Src Addr | Dst NIC | Src NIC | BW (MEASURED) | RTT DELAY DIFFERENCE | COST (UPSTREAM) | COST (DOWNSTREAM) | STABILITY | MOBILITY |
|---|---|---|---|---|---|---|---|---|---|---|
| PATH 1 | IP10 | IP11 | NIC100 | NIC110 | 5M | 30 | 0 | — | A | B |
| PATH 2 | IP10 | IP11 | NIC100 | NIC111 | 100k | 0 | 10 | — | C | B |
| PATH 3 | IP10 | IP11 | NIC101 | NIC110 | 7M | 50 | 0 | — | B | B |
| PATH 4 | IP10 | IP11 | NIC101 | NIC111 | 120k | 60 | 10 | — | A | A |
| PATH 5 | IP11 | IP10 | NIC110 | NIC100 | 4M | 0 | — | 10 | A | B |
| PATH 6 | IP11 | IP10 | NIC110 | NIC101 | 500k | 20 | — | 10 | B | B |
| PATH 7 | IP11 | IP10 | NIC111 | NIC100 | 6M | 40 | — | 0 | A | A |
| PATH 8 | IP11 | IP10 | NIC111 | NIC101 | 600k | 40 | — | 0 | A | A |

FIG.13

|  | FLOW 10-1 | FLOW 10-2 |
|---|---|---|
| COMBINATION 1 | PATH 1 | PATH 1 |
| COMBINATION 2 | PATH 1 | PATH 2 |
| COMBINATION 3 | PATH 1 | PATH 3 |
| COMBINATION 4 | PATH 1 | PATH 4 |
| COMBINATION 5 | PATH 2 | PATH 1 |
| COMBINATION 6 | PATH 2 | PATH 2 |
| COMBINATION 7 | PATH 2 | PATH 3 |
| COMBINATION 8 | PATH 2 | PATH 4 |
| COMBINATION 9 | PATH 3 | PATH 1 |
| COMBINATION 10 | PATH 3 | PATH 2 |
| COMBINATION 11 | PATH 3 | PATH 3 |
| COMBINATION 12 | PATH 3 | PATH 4 |
| COMBINATION 13 | PATH 4 | PATH 1 |
| COMBINATION 14 | PATH 4 | PATH 2 |
| COMBINATION 15 | PATH 4 | PATH 3 |
| COMBINATION 16 | PATH 4 | PATH 4 |

FIG.14

|  | FLOW 10-1 | | FLOW 10-2 | | SCORE |
|---|---|---|---|---|---|
|  | UTILIZED PATH | ALLOCATED BANDWIDTH | UTILIZED PATH | ALLOCATED BANDWIDTH | |
| COMBINATION 1 | PATH 1 | 64kbps | PATH 1 | 500kbps | |
| COMBINATION 2 | PATH 1 | 64kbps | PATH 2 | 0kbps | |
| COMBINATION 3 | PATH 1 | 64kbps | PATH 3 | 500kbps | |
| COMBINATION 4 | PATH 1 | 64kbps | PATH 4 | 0kbps | |
| COMBINATION 5 | PATH 2 | 8kbps | PATH 1 | 500kbps | |
| COMBINATION 6 | PATH 2 | 8kbps | PATH 2 | 0kbps | |
| COMBINATION 7 | PATH 2 | 8kbps | PATH 3 | 500kbps | |
| COMBINATION 8 | PATH 2 | 8kbps | PATH 4 | 0kbps | |
| COMBINATION 9 | PATH 3 | 64kbps | PATH 1 | 500kbps | |
| COMBINATION 10 | PATH 3 | 64kbps | PATH 2 | 0kbps | |
| COMBINATION 11 | PATH 3 | 64kbps | PATH 3 | 500kbps | |
| COMBINATION 12 | PATH 3 | 64kbps | PATH 4 | 0kbps | |
| COMBINATION 13 | PATH 4 | 8kbps | PATH 1 | 500kbps | |
| COMBINATION 14 | PATH 4 | 8kbps | PATH 2 | 0kbps | |
| COMBINATION 15 | PATH 4 | 8kbps | PATH 3 | 500kbps | |
| COMBINATION 16 | PATH 4 | 8kbps | PATH 4 | 0kbps | |

FIG.15

|  | BW | RTT | COST | STABILITY | MOBILITY | SCORE OF FLOW 10-1 |
|---|---|---|---|---|---|---|
| FLOW 10-1- COMBINATION 1 | 100 | 85 | 0 | 100 | 90 | 1030 |
| FLOW 10-1- COMBINATION 2 | 100 | 85 | 0 | 100 | 90 | 1030 |
| FLOW 10-1- COMBINATION 3 | 100 | 85 | 0 | 100 | 90 | 1030 |
| FLOW 10-1- COMBINATION 4 | 100 | 85 | 0 | 100 | 90 | 1030 |
| FLOW 10-1- COMBINATION 5 | 80 | 100 | 0 | 80 | 90 | 970 |
| FLOW 10-1- COMBINATION 6 | 80 | 100 | 0 | 80 | 90 | 970 |
| FLOW 10-1- COMBINATION 7 | 80 | 100 | 0 | 80 | 90 | 970 |
| FLOW 10-1- COMBINATION 8 | 80 | 100 | 0 | 80 | 90 | 970 |
| FLOW 10-1- COMBINATION 9 | 100 | 75 | 0 | 90 | 90 | 980 |
| FLOW 10-1- COMBINATION 10 | 100 | 75 | 0 | 90 | 90 | 980 |
| FLOW 10-1- COMBINATION 11 | 100 | 75 | 0 | 90 | 90 | 980 |
| FLOW 10-1- COMBINATION 12 | 100 | 75 | 0 | 90 | 90 | 980 |
| FLOW 10-1- COMBINATION 13 | 80 | 70 | 0 | 100 | 100 | 880 |
| FLOW 10-1- COMBINATION 14 | 80 | 70 | 0 | 100 | 100 | 880 |
| FLOW 10-1- COMBINATION 15 | 80 | 70 | 0 | 100 | 100 | 880 |
| FLOW 10-1- COMBINATION 16 | 80 | 70 | 0 | 100 | 100 | 880 |

FIG.16

| | BW1 | BW2 | RTT DELAY DIFFERENCE | COST | STABILITY | MOBILITY | SCORE OF FLOW 10-2 |
|---|---|---|---|---|---|---|---|
| FLOW 10-2-COMBINATION 1 | 100 | 100 | 0 | 100 | 100 | 90 | 990 |
| FLOW 10-2-COMBINATION 2 | 80 | 80 | 0 | 100 | 80 | 90 | 870 |
| FLOW 10-2-COMBINATION 3 | 100 | 100 | 0 | 60 | 90 | 90 | 860 |
| FLOW 10-2-COMBINATION 4 | 80 | 80 | 0 | 60 | 100 | 100 | 780 |
| FLOW 10-2-COMBINATION 5 | 100 | 100 | 0 | 100 | 100 | 90 | 990 |
| FLOW 10-2-COMBINATION 6 | 80 | 80 | 0 | 100 | 80 | 90 | 870 |
| FLOW 10-2-COMBINATION 7 | 100 | 100 | 0 | 60 | 90 | 90 | 860 |
| FLOW 10-2-COMBINATION 8 | 80 | 80 | 0 | 60 | 100 | 100 | 780 |
| FLOW 10-2-COMBINATION 9 | 100 | 100 | 0 | 100 | 100 | 90 | 990 |
| FLOW 10-2-COMBINATION 10 | 80 | 80 | 0 | 100 | 80 | 90 | 870 |
| FLOW 10-2-COMBINATION 11 | 100 | 100 | 0 | 60 | 90 | 90 | 860 |
| FLOW 10-2-COMBINATION 12 | 80 | 80 | 0 | 60 | 100 | 100 | 780 |
| FLOW 10-2-COMBINATION 13 | 100 | 100 | 0 | 100 | 100 | 90 | 990 |
| FLOW 10-2-COMBINATION 14 | 80 | 80 | 0 | 100 | 80 | 90 | 870 |
| FLOW 10-2-COMBINATION 15 | 100 | 100 | 0 | 60 | 90 | 90 | 860 |
| FLOW 10-2-COMBINATION 16 | 80 | 80 | 0 | 60 | 100 | 100 | 780 |

FIG.17

|  | FLOW 10-1 | | FLOW 10-2 | | SCORE |
| --- | --- | --- | --- | --- | --- |
|  | UTILIZED PATH | ALLOCATED BANDWIDTH | UTILIZED PATH | ALLOCATED BANDWIDTH | |
| COMBINATION 1 | PATH 1 | 64kbps | PATH 1 | 500kbps | 2020 |
| COMBINATION 2 | PATH 1 | 64kbps | PATH 2 | 0kbps | 1900 |
| COMBINATION 3 | PATH 1 | 64kbps | PATH 3 | 500kbps | 1890 |
| COMBINATION 4 | PATH 1 | 64kbps | PATH 4 | 0kbps | 1810 |
| COMBINATION 5 | PATH 2 | 8kbps | PATH 1 | 500kbps | 1960 |
| COMBINATION 6 | PATH 2 | 8kbps | PATH 2 | 0kbps | 1840 |
| COMBINATION 7 | PATH 2 | 8kbps | PATH 3 | 500kbps | 1830 |
| COMBINATION 8 | PATH 2 | 8kbps | PATH 4 | 0kbps | 1750 |
| COMBINATION 9 | PATH 3 | 64kbps | PATH 1 | 500kbps | 1970 |
| COMBINATION 10 | PATH 3 | 64kbps | PATH 2 | 0kbps | 1850 |
| COMBINATION 11 | PATH 3 | 64kbps | PATH 3 | 500kbps | 1840 |
| COMBINATION 12 | PATH 3 | 64kbps | PATH 4 | 0kbps | 1760 |
| COMBINATION 13 | PATH 4 | 8kbps | PATH 1 | 500kbps | 1870 |
| COMBINATION 14 | PATH 4 | 8kbps | PATH 2 | 0kbps | 1750 |
| COMBINATION 15 | PATH 4 | 8kbps | PATH 3 | 500kbps | 1740 |
| COMBINATION 16 | PATH 4 | 8kbps | PATH 4 | 0kbps | 1660 |

FIG.18

|  | FLOW 11-1 | | FLOW 11-2 | | SCORE |
|---|---|---|---|---|---|
|  | UTILIZED PATH | ALLOCATED BANDWIDTH | UTILIZED PATH | ALLOCATED BANDWIDTH | |
| COMBINATION 1 | PATH 5 | 64kbps | PATH 5 | 500kbps | |
| COMBINATION 2 | PATH 5 | 64kbps | PATH 6 | 100kbps | |
| COMBINATION 3 | PATH 5 | 64kbps | PATH 7 | 500kbps | |
| COMBINATION 4 | PATH 5 | 64kbps | PATH 8 | 100kbps | |
| COMBINATION 5 | PATH 6 | 64kbps | PATH 5 | 500kbps | |
| COMBINATION 6 | PATH 6 | 64kbps | PATH 6 | 100kbps | |
| COMBINATION 7 | PATH 6 | 64kbps | PATH 7 | 500kbps | |
| COMBINATION 8 | PATH 6 | 64kbps | PATH 8 | 100kbps | |
| COMBINATION 9 | PATH 7 | 64kbps | PATH 5 | 500kbps | |
| COMBINATION 10 | PATH 7 | 64kbps | PATH 6 | 100kbps | |
| COMBINATION 11 | PATH 7 | 64kbps | PATH 7 | 500kbps | |
| COMBINATION 12 | PATH 7 | 64kbps | PATH 8 | 100kbps | |
| COMBINATION 13 | PATH 8 | 64kbps | PATH 5 | 500kbps | |
| COMBINATION 14 | PATH 8 | 64kbps | PATH 6 | 100kbps | |
| COMBINATION 15 | PATH 8 | 64kbps | PATH 7 | 500kbps | |
| COMBINATION 16 | PATH 8 | 64kbps | PATH 8 | 100kbps | |

FIG.19

|  | BW | RTT | COST | STABILITY | MOBILITY | SCORE OF FLOW 11-1 |
|---|---|---|---|---|---|---|
| FLOW 11-1- COMBINATION 1 | 100 | 100 | 0 | 100 | 90 | 1090 |
| FLOW 11-1- COMBINATION 2 | 100 | 100 | 0 | 100 | 90 | 1090 |
| FLOW 11-1- COMBINATION 3 | 100 | 100 | 0 | 100 | 90 | 1090 |
| FLOW 11-1- COMBINATION 4 | 100 | 100 | 0 | 100 | 90 | 1090 |
| FLOW 11-1- COMBINATION 5 | 100 | 85 | 0 | 90 | 90 | 1005 |
| FLOW 11-1- COMBINATION 6 | 100 | 85 | 0 | 90 | 90 | 1005 |
| FLOW 11-1- COMBINATION 7 | 100 | 85 | 0 | 90 | 90 | 1005 |
| FLOW 11-1- COMBINATION 8 | 100 | 85 | 0 | 90 | 90 | 1005 |
| FLOW 11-1- COMBINATION 9 | 100 | 70 | 0 | 100 | 100 | 950 |
| FLOW 11-1- COMBINATION 10 | 100 | 70 | 0 | 100 | 100 | 950 |
| FLOW 11-1- COMBINATION 11 | 100 | 70 | 0 | 100 | 100 | 950 |
| FLOW 11-1- COMBINATION 12 | 100 | 70 | 0 | 100 | 100 | 950 |
| FLOW 11-1- COMBINATION 13 | 100 | 70 | 0 | 100 | 100 | 950 |
| FLOW 11-1- COMBINATION 14 | 100 | 70 | 0 | 100 | 100 | 950 |
| FLOW 11-1- COMBINATION 15 | 100 | 70 | 0 | 100 | 100 | 950 |
| FLOW 11-1- COMBINATION 16 | 100 | 70 | 0 | 100 | 100 | 950 |

FIG.20

| | BW1 | BW2 | RTT DELAY DIFFERENCE | COST | STABILITY | MOBILITY | SCORE OF FLOW 11-2 |
|---|---|---|---|---|---|---|---|
| FLOW 11-2-COMBINATION 1 | 100 | 100 | 0 | 100 | 100 | 90 | 1190 |
| FLOW 11-2-COMBINATION 2 | 100 | 80 | 0 | 60 | 90 | 90 | 940 |
| FLOW 11-2-COMBINATION 3 | 100 | 100 | 0 | 100 | 100 | 100 | 1200 |
| FLOW 11-2-COMBINATION 4 | 100 | 80 | 0 | 60 | 100 | 100 | 960 |
| FLOW 11-2-COMBINATION 5 | 100 | 100 | 0 | 100 | 100 | 90 | 1190 |
| FLOW 11-2-COMBINATION 6 | 100 | 80 | 0 | 60 | 90 | 90 | 940 |
| FLOW 11-2-COMBINATION 7 | 100 | 100 | 0 | 100 | 100 | 100 | 1200 |
| FLOW 11-2-COMBINATION 8 | 100 | 80 | 0 | 60 | 100 | 100 | 960 |
| FLOW 11-2-COMBINATION 9 | 100 | 100 | 0 | 100 | 100 | 90 | 1190 |
| FLOW 11-2-COMBINATION 10 | 100 | 80 | 0 | 60 | 90 | 90 | 940 |
| FLOW 11-2-COMBINATION 11 | 100 | 100 | 0 | 100 | 100 | 100 | 1200 |
| FLOW 11-2-COMBINATION 12 | 100 | 80 | 0 | 60 | 100 | 100 | 960 |
| FLOW 11-2-COMBINATION 13 | 100 | 100 | 0 | 100 | 100 | 90 | 1190 |
| FLOW 11-2-COMBINATION 14 | 100 | 80 | 0 | 60 | 90 | 90 | 940 |
| FLOW 11-2-COMBINATION 15 | 100 | 100 | 0 | 100 | 100 | 100 | 1200 |
| FLOW 11-2-COMBINATION 16 | 100 | 80 | 0 | 60 | 100 | 100 | 960 |

FIG.21

|  | FLOW 11-1 | | FLOW 11-2 | | SCORE |
|---|---|---|---|---|---|
|  | UTILIZED PATH | ALLOCATED BANDWIDTH | UTILIZED PATH | ALLOCATED BANDWIDTH |  |
| COMBINATION 1 | PATH 5 | 64kbps | PATH 5 | 500kbps | 2280 |
| COMBINATION 2 | PATH 5 | 64kbps | PATH 6 | 100kbps | 2030 |
| COMBINATION 3 | PATH 5 | 64kbps | PATH 7 | 500kbps | 2290 |
| COMBINATION 4 | PATH 5 | 64kbps | PATH 8 | 100kbps | 2050 |
| COMBINATION 5 | PATH 6 | 64kbps | PATH 5 | 500kbps | 2195 |
| COMBINATION 6 | PATH 6 | 64kbps | PATH 6 | 100kbps | 1945 |
| COMBINATION 7 | PATH 6 | 64kbps | PATH 7 | 500kbps | 2205 |
| COMBINATION 8 | PATH 6 | 64kbps | PATH 8 | 100kbps | 1965 |
| COMBINATION 9 | PATH 7 | 64kbps | PATH 5 | 500kbps | 2120 |
| COMBINATION 10 | PATH 7 | 64kbps | PATH 6 | 100kbps | 1890 |
| COMBINATION 11 | PATH 7 | 64kbps | PATH 7 | 500kbps | 2110 |
| COMBINATION 12 | PATH 7 | 64kbps | PATH 8 | 100kbps | 1910 |
| COMBINATION 13 | PATH 8 | 64kbps | PATH 5 | 500kbps | 2140 |
| COMBINATION 14 | PATH 8 | 64kbps | PATH 6 | 100kbps | 1890 |
| COMBINATION 15 | PATH 8 | 64kbps | PATH 7 | 500kbps | 2150 |
| COMBINATION 16 | PATH 8 | 64kbps | PATH 8 | 100kbps | 1910 |

| | FLOW 10-1 | | FLOW 10-2 | | SCORE |
|---|---|---|---|---|---|
| | UTILIZED PATH | ALLOCATED BANDWIDTH | UTILIZED PATH | ALLOCATED BANDWIDTH | |
| COMBINATION 1 (COMBINATION 1) | PATH 1 | 64kbps | PATH 1 | 500kbps | 2020 |
| COMBINATION 2 (COMBINATION 6) | PATH 2 | 64kbps | PATH 2 | 100kbps | 1840 |

(B)

| | FLOW 10-1 | | FLOW 10-2 | | SCORE | TOTAL SCORE |
|---|---|---|---|---|---|---|
| | UTILIZED PATH | ALLOCATED BANDWIDTH | UTILIZED PATH | ALLOCATED BANDWIDTH | | |
| COMBINATION 1 | PATH 1 | 64kbps | PATH 1 | 500kbps | 2020 | 2620 |
| COMBINATION 2 | PATH 2 | 64kbps | PATH 2 | 100kbps | 1840 | 2320 |

(C)

| FLOW 10-1 | | FLOW 10-2 | |
|---|---|---|---|
| UTILIZED PATH | ALLOCATED BANDWIDTH | UTILIZED PATH | ALLOCATED BANDWIDTH |
| PATH 1 | 64kbps | PATH 1 | 500kbps |

FIG.23

| DstHoA | DstPort | SrcHoA | SrcPort | Protocol | TCP/UDP | SrcIF | SrcCoA | DstCoA |
|---|---|---|---|---|---|---|---|---|
| IP10 | 7080 | IP11 | * | 6 | UDP | NIC110 | IP110 | IP100 |
| IP10 | 9080 | IP11 | * | 6 | UDP | NIC110 | IP110 | IP100 |

| SrcAddr IP110 | DstAddr IP100 | RT Type2 IP10 | Dst Op IP11 | UDP 7080 |
|---|---|---|---|---|

(B)

| SrcAddr IP110 | DstAddr IP100 | RT Type2 IP10 | Dst Op IP11 | UDP 9080 |
|---|---|---|---|---|

(C)

| SrcAddr IP100 | DstAddr IP110 | RT Type2 IP11 | Dst Op IP10 | UDP 7080 |
|---|---|---|---|---|

(D)

| SrcAddr IP100 | DstAddr IP111 | RT Type2 IP11 | Dst Op IP10 | UDP 9080 |
|---|---|---|---|---|

| | FLOW 11-1 | | FLOW 11-2 | | SCORE |
|---|---|---|---|---|---|
| | UTILIZED PATH | ALLOCATED BANDWIDTH | UTILIZED PATH | ALLOCATED BANDWIDTH | |
| COMBINATION 1 (COMBINATION 3) | PATH 5 | 64kbps | PATH 7 | 500kbps | 2290 |
| COMBINATION 2 (COMBINATION 8) | PATH 5 | 64kbps | PATH 8 | 100kbps | 1965 |

(B)

| | FLOW 11-1 | | FLOW 11-2 | | SCORE | TOTAL SCORE |
|---|---|---|---|---|---|---|
| | UTILIZED PATH | ALLOCATED BANDWIDTH | UTILIZED PATH | ALLOCATED BANDWIDTH | | |
| COMBINATION 1 | PATH 5 | 64kbps | PATH 7 | 500kbps | 2020 | 2630 |
| COMBINATION 2 | PATH 6 | 64kbps | PATH 8 | 100kbps | 1840 | 2320 |

(C)

| FLOW 11-1 | | FLOW 11-2 | |
|---|---|---|---|
| UTILIZED PATH | ALLOCATED BANDWIDTH | UTILIZED PATH | ALLOCATED BANDWIDTH |
| PATH 5 | 64kbps | PATH 7 | 500kbps |

| DstHoA | DstPort | SrcHoA | SrcPort | Protocol | TCP/UDP | SrcIF | SrcCoA | DstCoA |
|---|---|---|---|---|---|---|---|---|
| IP11 | 7080 | IP10 | * | 6 | UDP | NIC100 | IP100 | IP111 |
| IP11 | 9080 | IP10 | * | 6 | UDP | NIC100 | IP100 | IP111 |

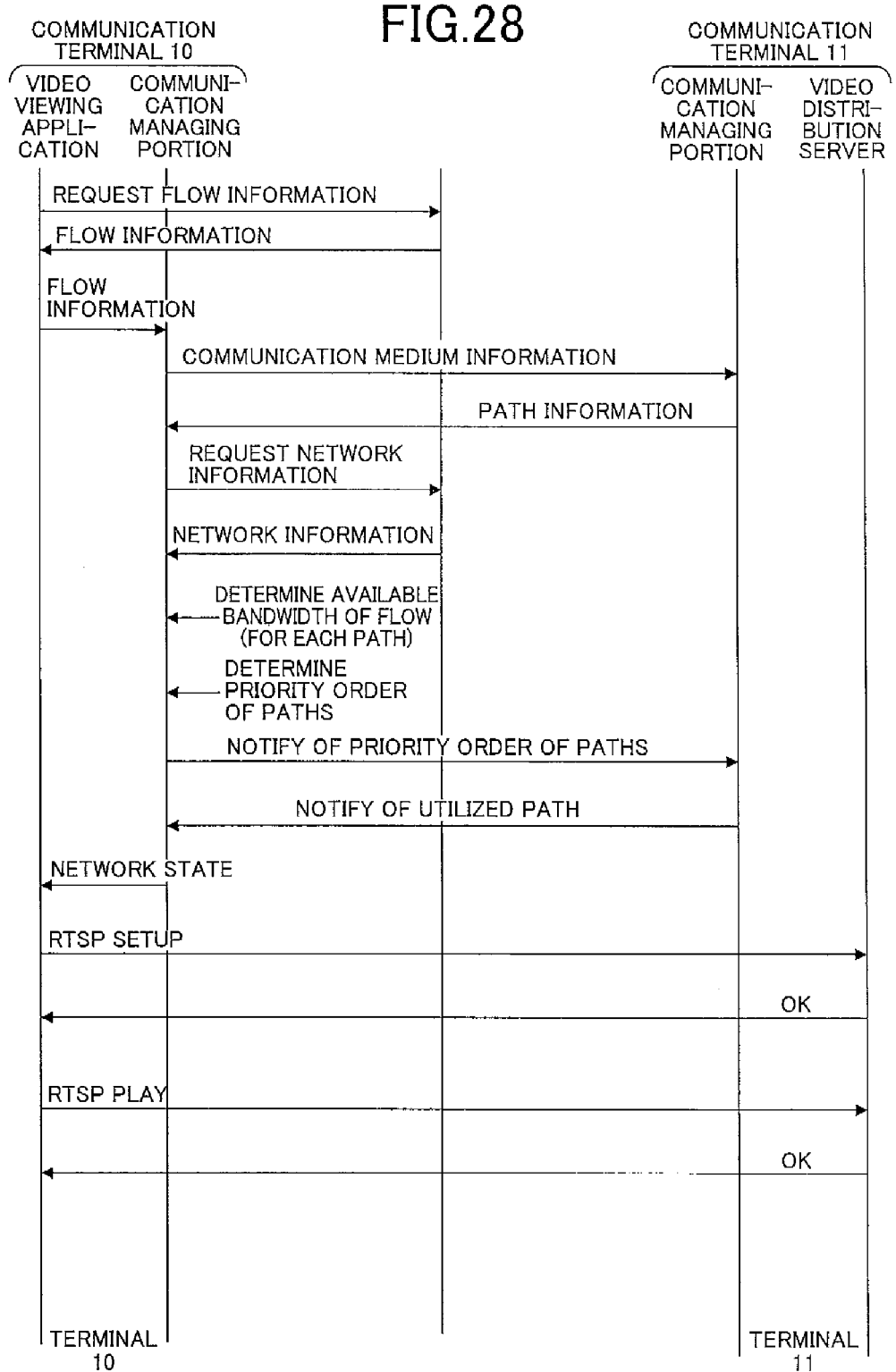

|  | Dst Addr | Src Addr | Dst Port | BW(min) | BW(max) |
|---|---|---|---|---|---|
| FLOW 1 | IP10 | IP11 | 9080 | 2M Must | 2M *1 |
| FLOW 2 | IP10 | IP11 | 9090 | 3M Must | 3M *1 |
| FLOW 3 | IP10 | IP11 | 9070 | 4M Must | 4M *1 |

(B)

|  | TERMINAL | CoA | BW (UPSTREAM) | BW (DOWNSTREAM) |
|---|---|---|---|---|
| NIC100 | 10 | CoA100 | – | 11M |
| NIC101 | 10 | CoA101 | – | 11M |

(C)

|  | Dst Addr | Src Addr | BW (MEASURED) | Dst NIC | Src NIC |
|---|---|---|---|---|---|
| PATH 1 | IP10 | IP11 |  | NIC100 | NIC110 |
| PATH 2 | IP10 | IP11 |  | NIC101 | NIC110 |

(D)

|  | TERMINAL | CoA | BW (UPSTREAM) | BW (DOWNSTREAM) |
|---|---|---|---|---|
| NIC100 | 10 | CoA100 | – | 11M |
| NIC101 | 10 | CoA101 | – | 11M |
| NIC110 | 11 | – | 10G | – |

(E)

|  | Dst Addr | Src Addr | BW (MEASURED) | Dst NIC | Src NIC |
|---|---|---|---|---|---|
| PATH 1 | IP10 | IP11 | 5.5M | NIC100 | NIC110 |
| PATH 2 | IP10 | IP11 | 4.5M | NIC101 | NIC110 |

FIG.30

|  | FLOW 1 | | FLOW 2 | | FLOW 3 | |
|---|---|---|---|---|---|---|
|  | UTILIZED PATH | ALLOCATED BANDWIDTH | UTILIZED PATH | ALLOCATED BANDWIDTH | UTILIZED PATH | ALLOCATED BANDWIDTH |
| COMBINATION 1 | 1 | 2M | 1 | 3M | 1 | NG |
| COMBINATION 2 | 1 | 2M | 1 | 3M | 2 | 4M |
| COMBINATION 3 | 1 | 2M | 2 | 3M | 1 | NG |
| COMBINATION 4 | 1 | 2M | 2 | 3M | 2 | NG |
| COMBINATION 5 | 2 | 2M | 1 | 3M | 1 | NG |
| COMBINATION 6 | 2 | 2M | 1 | 3M | 2 | NG |
| COMBINATION 7 | 2 | 2M | 2 | NG | 1 | 4M |
| COMBINATION 8 | 2 | 2M | 2 | NG | 2 | NG |

FIG.31

| DstHoA | DstPort | SrcHoA | SrcPort | Protocol | TCP/UDP | SrcIF | SrcCoA | DstCoA |
|---|---|---|---|---|---|---|---|---|
| IP10 | 9080 | IP11 | * | 6 | UDP | NIC110 | IP11 | IP100 |
| IP10 | 9080 | IP11 | * | 6 | UDP | NIC110 | IP11 | IP100 |
| IP10 | 9070 | IP11 | * | 6 | UDP | NIC110 | IP11 | IP101 |

|  | Dst Addr | Src Addr | Dst Port | BW(min) | BW(max) |
|---|---|---|---|---|---|
| FLOW 1 | IP10 | IP11 | 7080 | 8k *1 | 64k *3 |
| FLOW 2 | IP11 | IP10 | 7080 | 8k *1 | 64k *3 |

(B)

|  | Dst Addr | Src Addr | Dst Port | BW(min) | BW(max) |
|---|---|---|---|---|---|
| FLOW 1 | IP10 | IP12 | 7090 | 8k *1 | 64k *3 |
| FLOW 2 | IP12 | IP10 | 7080 | 8k *1 | 64k *3 |

(C)

|  | Dst Addr | Src Addr | Dst Port | BW(min) | BW(max) |
|---|---|---|---|---|---|
| FLOW 1 | IP10 | IP11 | 7080 | 8k *1 | 64k *3 |
| FLOW 2 | IP11 | IP10 | 7080 | 8k *1 | 64k *3 |

(D)

|  | Dst Addr | Src Addr | Dst Port | BW(min) | BW(max) |
|---|---|---|---|---|---|
| FLOW 1 | IP10 | IP12 | 7090 | 8k *1 | 64k *3 |
| FLOW 2 | IP12 | IP10 | 7080 | 8k *1 | 64k *3 |

|  | Dst Addr | Src Addr | BW (MEASURED) | Dst NIC | Src NIC |
|---|---|---|---|---|---|
| PATH 1 | IP10 | IP11 | 600k | NIC100 | NIC110 |
| PATH 2 | IP10 | IP11 | 1M | NIC101 | NIC110 |
| PATH 3 | IP11 | IP10 | 2M | NIC110 | NIC100 |
| PATH 4 | IP11 | IP10 | 300k | NIC110 | NIC101 |

(B)

|  | TERMINAL | HoA | CoA | BW (UPSTREAM) | BW (DOWNSTREAM) |
|---|---|---|---|---|---|
| NIC100 | 10 | IP10 | CoA100 | 11M | 11M |
| NIC101 | 10 | IP10 | CoA101 | 1M | 54M |
| NIC110 | 11 | IP11 | CoA110 | 1M | 54M |

(C)

|  | FLOW 1 |
|---|---|
| Dst Addr | IP11 |
| Src Addr | IP10 |
| COMBINATION 1 | PATH 1 |
| COMBINATION 2 | PATH 2 |

(D)

|  | FLOW 2 |
|---|---|
| Dst Addr | IP10 |
| Src Addr | IP11 |
| COMBINATION 1 | PATH 3 |
| COMBINATION 2 | PATH 4 |

|  | Dst Addr | Src Addr | BW (MEASURED) | Dst NIC | Src NIC |
|---|---|---|---|---|---|
| PATH 1 | IP10 | IP12 | 300k | NIC100 | NIC110 |
| PATH 2 | IP10 | IP12 | 2M | NIC101 | NIC110 |
| PATH 3 | IP12 | IP10 | 500k | NIC110 | NIC100 |
| PATH 4 | IP12 | IP10 | 500k | NIC110 | NIC101 |

(B)

|  | TERMINAL | HoA | CoA | BW (UPSTREAM) | BW (DOWNSTREAM) |
|---|---|---|---|---|---|
| NIC100 | 10 | IP10 | CoA100 | 11M | 11M |
| NIC101 | 10 | IP10 | CoA101 | 1M | 54M |
| NIC120 | 12 | IP12 | CoA120 | 11M | 11M |

(C)

|  | FLOW 1 |
|---|---|
| Dst IP | IP12 |
| Src IP | IP10 |
| COMBINATION 1 | PATH 1 |
| COMBINATION 2 | PATH 2 |

(D)

|  | FLOW 2 |
|---|---|
| Dst IP | IP10 |
| Src IP | IP12 |
| COMBINATION 1 | PATH 3 |
| COMBINATION 2 | PATH 4 |

|  | TERMINAL 11 | TERMINAL 12 | SCORE |
|---|---|---|---|
| COMBINATION 1 | COMBINATION 1 | COMBINATION 1 | 750 |
| COMBINATION 2 | COMBINATION 1 | COMBINATION 2 | 760 |
| COMBINATION 3 | COMBINATION 2 | COMBINATION 1 | 720 |
| COMBINATION 4 | COMBINATION 2 | COMBINATION 2 | 730 |

(B)

|  | TERMINAL 11 | TERMINAL 12 | SCORE |
|---|---|---|---|
| COMBINATION 2 | COMBINATION 1 | COMBINATION 2 | 760 |

|  | FLOW 2 | SCORE |
|---|---|---|
| Dst Addr | IP10 |  |
| Src Addr | IP11 |  |
| COMBINATION 1 | PATH 3 | 700 |
| COMBINATION 2 | PATH 4 | 720 |

(B)

|  | FLOW 2 | SCORE |
|---|---|---|
| Dst Addr | IP10 |  |
| Src Addr | IP12 |  |
| COMBINATION 1 | PATH 3 | 740 |
| COMBINATION 2 | PATH 4 | 730 |

| Src HoA | Dst HoA | Src Port | Dst Port | Proto col | TCP /UDP | SrcIF | SrcCoA | DstIF | DstCoA |
|---|---|---|---|---|---|---|---|---|---|
| IP10 | IP11 | * | 7080 | 6 | UDP | NIC100 | IP100 | NIC110 | IP110 |
| IP10 | IP12 | * | 7080 | 6 | UDP | NIC101 | IP101 | NIC120 | IP120 |

(B)

| Src HoA | Dst HoA | Src Port | Dst Port | Proto col | TCP /UDP | SrcIF | SrcCoA | DstIF | DstCoA |
|---|---|---|---|---|---|---|---|---|---|
| IP11 | IP10 | * | 7080 | 6 | UDP | NIC110 | IP110 | NIC101 | IP101 |

(C)

| Src HoA | Dst HoA | SrcP Port | Dst Port | Proto col | TCP /UDP | SrcIF | SrcCoA | DstIF | DstCoA |
|---|---|---|---|---|---|---|---|---|---|
| IP12 | IP10 | * | 7081 | 6 | UDP | NIC120 | IP120 | NIC100 | IP100 |

FIG.44

| | Dst Addr (HoA) | Src Addr (HoA) | Dst Port | BW1 | BW2 | BW3 | DELAY DIFFERENCE | COST (UPSTREAM) | COST (DOWNSTREAM) | STABILITY | MOBILITY |
|---|---|---|---|---|---|---|---|---|---|---|---|
| FLOW 10-1 | IP10 | IP12 | 9200 | 64k Must | 1M *2 | 6M *5 | Min *2 | — | *3 | Max *1 | Max *1 |

FIG.45

| | Dst Addr (HoA) | Src Addr (HoA) | Dst Port | BW1 | BW2 | BW3 | DELAY DIFFERENCE | COST (UPSTREAM) | COST (DOWNSTREAM) | STABILITY | MOBILITY |
|---|---|---|---|---|---|---|---|---|---|---|---|
| FLOW 10-2 | IP10 | IP11 | 7080 | 8k Must | 64k *5 | | Min *4 | — | *0 | Max *1 | Max *1 |
| FLOW 10-3 | IP10 | IP11 | 9080 | 0k *0 | 100k *3 | 500k *2 | *0 | — | Min *3 | Max *1 | Max *1 |
| FLOW 11-2 | IP11 | IP10 | 7080 | — | — | — | — | Min *1 | — | — | — |
| FLOW 11-3 | IP11 | IP10 | 9080 | — | — | — | — | Min *0 | — | — | — |

| | Dst Addr | Src Addr | Dst NIC | Src NIC | BW (MEASURED) | RTT DELAY | COST (UPSTREAM) | COST (DOWNSTREAM) | STABILITY | MOBILITY |
|---|---|---|---|---|---|---|---|---|---|---|
| PATH 10-12-1 | IP10 | IP12 | NIC100 | NIC120 | 3M | 0 | — | 0 | A | A |
| PATH 10-12-2 | IP11 | IP12 | NIC101 | NIC120 | 20M | 50ms | — | 5 | A | B |

(B)

| | HoA | CoA | BW (UPSTREAM) | BW (DOWNSTREAM) | MOBILITY |
|---|---|---|---|---|---|
| NIC100 | IP10 | CoA100 | 11M | 11M | A |
| NIC101 | IP10 | CoA101 | 1M | 54M | B |
| NIC120 | IP12 | IP12 | 1G | 1G | — |

| | Dst Addr | Src Addr | Dst NIC | Src NIC | BW (MEASURED) | RTT DELAY | COST (UPSTREAM) | COST (DOWNSTREAM) | STABILITY | MOBILITY |
|---|---|---|---|---|---|---|---|---|---|---|
| PATH 10-11-1 | IP10 | IP11 | NIC100 | NIC110 | | | | | | |
| PATH 10-11-2 | IP10 | IP11 | NIC100 | NIC111 | | | | | | |
| PATH 10-11-3 | IP10 | IP11 | NIC101 | NIC100 | | | | | | |
| PATH 10-11-4 | IP10 | IP11 | NIC101 | NIC100 | | | | | | |
| PATH 10-11-5 | IP11 | IP10 | NIC110 | NIC100 | | | | | | |
| PATH 10-11-6 | IP11 | IP10 | NIC110 | NIC101 | | | | | | |
| PATH 10-11-7 | IP11 | IP10 | NIC111 | NIC100 | | | | | | |
| PATH 10-11-8 | IP11 | IP10 | NIC111 | NIC101 | | | | | | |

(B)

| | HoA | CoA | BW (UPSTREAM) | BW (DOWNSTREAM) | MOBILITY |
|---|---|---|---|---|---|
| NIC100 | IP10 | CoA100 | 11M | 11M | A |
| NIC101 | IP10 | CoA101 | 1M | 54M | B |
| NIC110 | IP11 | CoA110 | 11M | 11M | A |
| NIC111 | IP11 | CoA111 | 1M | 54M | B |

| | Dst Addr | Src Addr | Dst NIC | Src NIC | BW (MEASURED) | RTT DELAY | COST (UPSTREAM) | COST (DOWNSTREAM) | STABILITY | MOBILITY |
|---|---|---|---|---|---|---|---|---|---|---|
| PATH 10-11-1 | IP10 | IP11 | NIC100 | NIC110 | 3M | 50 | — | 2 | A | A |
| PATH 10-11-2 | IP10 | IP11 | NIC100 | NIC111 | 500k | 0 | — | 4 | B | B |
| PATH 10-11-3 | IP10 | IP11 | NIC101 | NIC100 | 5M | 70 | — | 5 | B | B |
| PATH 10-11-4 | IP10 | IP11 | NIC101 | NIC100 | 500k | 80 | — | 4 | A | B |
| PATH 10-11-5 | IP11 | IP10 | NIC110 | NIC100 | 4M | 90 | 2 | — | A | A |
| PATH 10-11-6 | IP11 | IP10 | NIC110 | NIC101 | 300k | 50 | 2 | — | A | B |
| PATH 10-11-7 | IP11 | IP10 | NIC111 | NIC100 | 4M | 80 | 3 | — | B | B |
| PATH 10-11-8 | IP11 | IP10 | NIC111 | NIC101 | 300k | 0 | 1 | — | B | B |

(B)

| | Dst Addr | Src Addr | Dst NIC | Src NIC | BW (MEASURED) | RTT DELAY | COST (UPSTREAM) | COST (DOWNSTREAM) | STABILITY | MOBILITY |
|---|---|---|---|---|---|---|---|---|---|---|
| PATH 10-11-1 | IP10 | IP11 | NIC100 | NIC110 | 3M | 50 | 3 | — | A | A |
| PATH 10-11-2 | IP10 | IP11 | NIC100 | NIC111 | 500k | 0 | 5 | — | B | B |
| PATH 10-11-3 | IP10 | IP11 | NIC101 | NIC100 | 5M | 70 | 2 | — | A | B |
| PATH 10-11-4 | IP10 | IP11 | NIC101 | NIC100 | 500k | 80 | 3 | — | A | B |
| PATH 10-11-5 | IP11 | IP10 | NIC110 | NIC100 | 4M | 90 | — | 3 | A | A |
| PATH 10-11-6 | IP11 | IP10 | NIC110 | NIC101 | 300k | 50 | — | 4 | A | B |
| PATH 10-11-7 | IP11 | IP10 | NIC111 | NIC100 | 4M | 80 | — | 2 | B | B |
| PATH 10-11-8 | IP11 | IP10 | NIC111 | NIC101 | 300k | 0 | — | 1 | B | B |

FIG.49
(A)
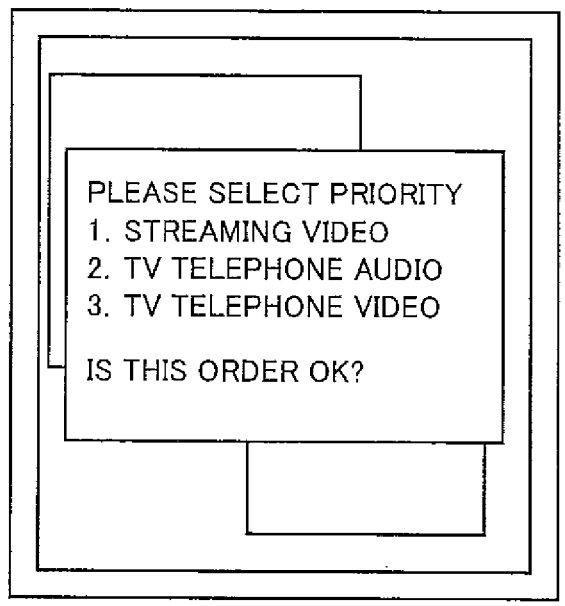
(B)
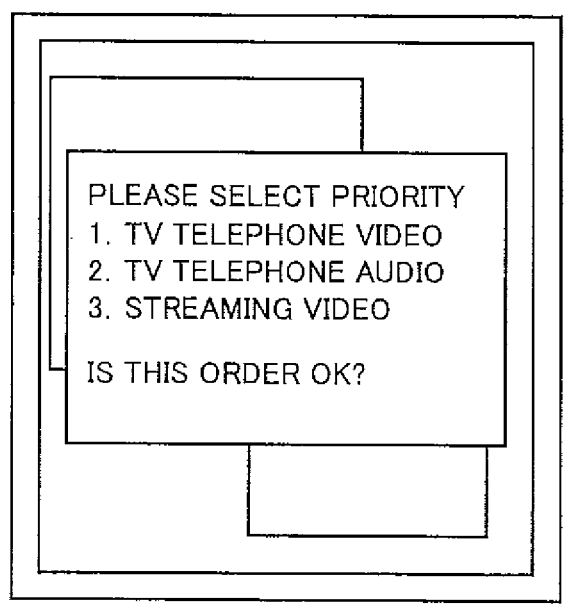

| FLOW 10-1 | SCORE |
|---|---|
| PATH 10-12-1 | 1300 |
| PATH 10-12-2 | 1340 |

(B)

| FLOW 10-2 | SCORE |
|---|---|
| PATH 10-11-1 | 1060 |
| PATH 10-11-2 | 1080 |
| PATH 10-11-3 | 1024 |
| PATH 10-11-4 | 1026 |

(C)

| FLOW 10-3 | SCORE |
|---|---|
| PATH 10-11-1 | 988 |
| PATH 10-11-2 | 916 |
| PATH 10-11-3 | 950 |
| PATH 10-11-4 | 926 |

|  | FLOW 10-2 | | FLOW 10-3 | | SCORE |
|---|---|---|---|---|---|
|  | UTILIZED PATH | ALLOCATED BANDWIDTH | UTILIZED PATH | ALLOCATED BANDWIDTH |  |
| COMBINATION 1 | PATH 10-11-2 | 64kbps | PATH 10-11-1 | 500kbps | 2068 |

(B)

|  | FLOW 10-1 | | SCORE |
|---|---|---|---|
|  | UTILIZED PATH | ALLOCATED BANDWIDTH |  |
| COMBINATION 1 | PATH 10-12-2 | 6Mbps | 1340 |

| SrcHoA | SrcPort | DstHoA | DstPort | Protocol | TCP/UDP | SrcIF | SrcCoA | DstCoA |
|---|---|---|---|---|---|---|---|---|
| IP11 | * | IP10 | 7080 | 6 | UDP | NIC111 | IP111 | IP100 |
| IP11 | * | IP10 | 9080 | 6 | UDP | NIC110 | IP110 | IP100 |

(B)

| SrcHoA | SrcPort | DstHoA | DstPort | Protocol | TCP/UDP | SrcIF | SrcCoA | DstCoA |
|---|---|---|---|---|---|---|---|---|
| IP12 | * | IP10 | 9200 | 6 | UDP | NIC120 | IP12 | IP101 |

| Dst HoA | DstPort | SrcHoA | SrcPort | Bw Mapped | STABILITY | COST | RTT DELAY DIFFERENCE |
|---|---|---|---|---|---|---|---|
| IP10 | 7080 | IP11 | * | 64k | B | 4 | 0 |
| IP10 | 9080 | IP11 | * | 500k | A | 2 | 50 |

(B)

| Dst HoA | DstPort | SrcHoA | SrcPort | Bw Mapped | STABILITY | COST | RTT DELAY DIFFERENCE |
|---|---|---|---|---|---|---|---|
| IP10 | 9200 | IP12 | * | 6M | A | 5 | 50 |

|  | Dst Addr (HoA) | Src Addr (HoA) | Dst Port | BW1 | BW2 | BW3 | DELAY DIFFERENCE | COST (UPSTREAM) | COST (DOWNSTREAM) | STABILITY | MOBILITY |
|---|---|---|---|---|---|---|---|---|---|---|---|
| FLOW 10-2 | IP10 | IP11 | 7080 | — | — | — | — | Min *0 | — | — | — |
| FLOW 10-3 | IP10 | IP11 | 9080 | — | — | — | — | Min *0 | — | — | — |
| FLOW 11-2 | IP11 | IP10 | 7080 | 8k Must | 64k *5 | — | Min *4 | — | Min *0 | Max *2 | Max *1 |
| FLOW 11-3 | IP11 | IP10 | 9080 | 0k *0 | 100k *1 | 500k *7 | Min *2 | — | Min *0 | Max *2 | Max *1 |

(B)

|  | Dst Addr | Src Addr | Dst Port | BW1 | BW2 | BW3 | DELAY DIFFERENCE | COST (UPSTREAM) | COST (DOWNSTREAM) | STABILITY | MOBILITY |
|---|---|---|---|---|---|---|---|---|---|---|---|
| FLOW 11-1 | IP11 | IP12 | 9200 | 64k Must | 1M *1 | 6M *1 | Min *1 | — | *6 | Max *1 | Max *1 |

| | HoA | CoA | BW (UPSTREAM) | BW (DOWNSTREAM) | MOBILITY |
|---|---|---|---|---|---|
| NIC110 | IP11 | CoA110 | 11M | 11M | A |
| NIC111 | IP11 | CoA111 | 1M | 54M | B |

(B)

| | Dst Addr | Src Addr | Dst NIC | Src NIC | BW (MEASURED) | RTT DELAY | COST (UPSTREAM) | COST (DOWNSTREAM) | STABILITY | MOBILITY |
|---|---|---|---|---|---|---|---|---|---|---|
| PATH 11-12-1 | IP10 | IP12 | NIC100 | NIC120 | 4M | 0 | — | 0 | A | A |
| PATH 11-12-2 | IP10 | IP12 | NIC101 | NIC120 | 18M | 50ms | — | 5 | A | A |

(C)

| | HoA | CoA | BW (UPSTREAM) | BW (DOWNSTREAM) | MOBILITY |
|---|---|---|---|---|---|
| NIC110 | IP11 | CoA110 | 11M | 11M | A |
| NIC111 | IP11 | CoA111 | 1M | 54M | B |
| NIC120 | IP12 | IP12 | 1G | 1G | — |

| FLOW 11-3 | SCORE |
|---|---|
| PATH 10-11-5 | 1264 |
| PATH 10-11-6 | 1130 |
| PATH 10-11-7 | 1238 |
| PATH 10-11-8 | 1130 |

(B)

| FLOW 11-2 | SCORE |
|---|---|
| PATH 10-11-5 | 1128 |
| PATH 10-11-6 | 1150 |
| PATH 10-11-7 | 1106 |
| PATH 10-11-8 | 1170 |

(C)

| FLOW 11-1 | SCORE |
|---|---|
| PATH 11-12-1 | 1080 |
| PATH 11-12-2 | 1030 |

|  | FLOW 11-2 | | FLOW 11-3 | | SCORE |
|---|---|---|---|---|---|
|  | UTILIZED PATH | ALLOCATED BANDWIDTH | UTILIZED PATH | ALLOCATED BANDWIDTH | |
| COMBINATION 1 | PATH 10-11-8 | 64kbps | PATH 10-11-5 | 500kbps | 2434 |
| COMBINATION 2 | PATH 10-11-5 | 64kbps | PATH 10-11-5 | 500kbps | 2392 |
| COMBINATION 3 | PATH 10-11-8 | 64kbps | PATH 10-11-8 | 100kbps | 2300 |

(B)

|  | FLOW 11-1 | | SCORE |
|---|---|---|---|
|  | UTILIZED PATH | ALLOCATED BANDWIDTH | |
| COMBINATION 1 | PATH 11-12-1 | 1Mbps | 1080 |

|  | FLOW 11-2 | | FLOW 11-3 | | SCORE |
|---|---|---|---|---|---|
|  | UTILIZED PATH | ALLOCATED BANDWIDTH | UTILIZED PATH | ALLOCATED BANDWIDTH | |
| COMBINATION 1 | PATH 10-11-8 | 64kbps | PATH 10-11-5 | 500kbps | 2532 |
| COMBINATION 2 | PATH 10-11-5 | 64kbps | PATH 10-11-5 | 500kbps | 2488 |
| COMBINATION 3 | PATH 10-11-8 | 64kbps | PATH 10-11-8 | 100kbps | 2398 |

(B)

|  | FLOW 11-2 | | FLOW 11-3 | | SCORE |
|---|---|---|---|---|---|
|  | UTILIZED PATH | ALLOCATED BANDWIDTH | UTILIZED PATH | ALLOCATED BANDWIDTH | |
| COMBINATION 1 | PATH 10-11-8 | 64kbps | PATH 10-11-5 | 500kbps | 2532 |

| SrcHoA | SrcPort | DstHoA | DstPort | Protocol | TCP/UDP | SrcIF | SrcCoA | DstCoA |
|---|---|---|---|---|---|---|---|---|
| IP10 | * | IP11 | 7080 | 6 | UDP | NIC101 | IP101 | IP111 |
| IP10 | * | IP11 | 9080 | 6 | UDP | NIC100 | IP100 | IP110 |

(B)

| SrcHoA | SrcPort | Dst HoA | DstPort | Bw Mapped | STABILITY | COST | RTT DELAY DIFFERENC |
|---|---|---|---|---|---|---|---|
| IP10 | * | IP11 | 7080 | 64k | B | 1 | 0 |
| IP10 | * | IP11 | 9080 | 500k | A | 3 | 90 |

| SrcHoA | SrcPort | DstHoA | DstPort | Protocol | TCP/UDP | SrcIF | SrcCoA | DstCoA |
|---|---|---|---|---|---|---|---|---|
| IP12 | * | IP11 | 9200 | 6 | UDP | NIC120 | IP12 | IP110 |

(B)

| SrcHoA | SrcPort | Dst HoA | DstPort | Bw Mapped | STABILITY | COST | RTT DELAY DIFFERENC |
|---|---|---|---|---|---|---|---|
| IP12 | * | IP11 | 9200 | 1M | A | 0 | 0 | ated multi-home that concurrently uses a plurality of communication media. However, the multi-home cannot be realized with the actual MobileIP specification. Therefore, because of a concept that a communication counterpart should be notified of all the CoAs, the "draft-wakikawa-mobileip-multiplecoa" is proposed as a means of realizing the multi-home, which is a specification of the MobileIP when a plurality of CoAs is included. Patent document 1 is known as a technology of using a plurality of media at the same time.

Patent Document 1: Published Japanese translation (Publication No. 2004-528764) of PCT publication (WO2002/080452)

DISCLOSURE OF THE INVENTION

Problems to be Solved by the Invention

Although the patent document 1 discloses a technology of routing a plurality of packet flows to a plurality of communication media (such as wireless LAN, mobile phone, and PHS), the technology is merely limited to a method of selecting an own communication medium (a bearer). Although transmission of packets can be controlled with this method, reception of packets cannot be controlled. That is, the routing disclosed in the patent document 1 is a technique for selecting the own bearer and is negligent in selection of a counterpart's bearer.

However, due to compatibility of networks, etc., the best case selected by each party is not necessarily the best solution in the communication between terminals having a plurality of communication media. In the patent document 1, for example, if a terminal A has two communication media and a terminal B has three communication media, the terminal A and the terminal B simply have two degrees of freedom and three degrees of freedom, respectively, but the optimum combination must actually be selected from 2×3=6 combinations. In some applications, it may be assumed that parameters other than the bandwidth are important.

For example, in the VOIP (Voice over Internet Protocol), even if the highest rate codec is used for connection with the MobileIPv6, a communication speed of at most 120 kbps is sufficient for a second layer of the OSI. As a result, in the case of a speed of 120 kbps or more, preferences exist, such as that delays, etc., should be prioritized over bandwidths. Although the MobileIP basically supports the handover through a plurality of communication media, no prescription exists for how to make good use of and manipulate the handover.

Although the "draft-wakikawa-mobileip-multiplecoa" also supports the multi home, no prescription exists for how to specifically realize the multi home and for selecting the optimum combination of communication media. For example, although communication quality is closely related to the charging, one may want high-quality communications regardless of charges, and the other may give more importance to charges than quality.

Since the charging may be performed in various forms, a problem may occur which cannot be solved by simply selecting a communication medium optimum for each party. Therefore, for example, although it may be considered that the communication terminals directly exchange preferences with each other, this may pose a problem of privacy. When a plurality of applications exists, it is not revealed what procedures are necessary. That is, if applications are mapped to one communication path, available bandwidths of the communication path are reduced. Therefore, although repeated combinations of a communication path and applications must be considered when mapping applications to the communication path, this has not yet been considered.

A preference to a flow (data flow) basically exists for a "downstream flow". That is, preferences such as "wanting to watch large clear videos" and "wanting to hear sound with less delay" are possessed by persons who receive the data. However, a data transmission path is determined by a transmitter generating IP packets. These tasks are desired to be achieved not only in communication between two terminals, but also in communication among a plurality of terminals.

The present invention was conceived in view of the above situations and it is therefore the object of the present invention to provide a transmitting/receiving method capable of selecting a combination of the own communication medium and counterpart's communication media reflecting a preference of a user or an application for each of a plurality of flows on a communication terminal, capable of communicating with a plurality of terminals, and capable of execution without the preference information being known by the counterpart.

Means for Solving the Problems

A transmitting/receiving method according to the present invention is a transmitting/receiving method of selecting a combination of flows and paths when transmitting/receiving one or more flows through one or more paths among a plurality of communication terminals. In each of a plurality of communication terminals, an application gives flow information including at least address information and preference information on a network to a communication managing portion. The communication managing portion of each communication terminal transmits communication medium information included in the communication terminal to a counterpart communication terminal based on the flow information, and the communication managing portion of the counterpart communication terminal generates path information from the communication medium information included in the transmission source communication terminal and the communication medium information included in the counterpart communication terminal and transmits the path information to the transmission source communication terminal.

The communication managing portion of each communication terminal generates combinations for mapping flows to paths from the flow information and the path information included in each terminal, transmits a score of each combination, performs setting such that the communication managing portion of each of a plurality of the communication terminals selects a combination having a higher score including the own upstream preference information to use a path for each data flow and enables to select a path for each flow.

In another transmitting/receiving method according to the present invention, when transmitting/receiving one or more flows through one or more paths between a communication terminal A and a communication terminal B, in the communication terminal A, an application gives flow information including at least address information and preference information on a network to a communication managing portion, and in the communication terminal B, an application gives flow information including at least address information to a communication managing portion. The communication managing portion of the communication terminal A transmits communication medium information included in the communication terminal A to the communication terminal B based on the flow information, and the communication managing portion of the communication terminal B generates path information from the received communication medium information included in the communication terminal A and the communication medium information included in the communication terminal B and transmits the path information to the communication terminal A.

The communication managing portions of the communication terminal A and the communication terminal B generate combinations for mapping flows to paths from the flow information and the path information included in each terminal and calculate and transmit a score of each combination from the preference information of each downstream flow. Setting is performed such that the communication managing portion of each of the communication terminal A and the communication terminal B selects a combination having the higher score including the own upstream preference information, uses a path for each data flow and enables a path selection for each flow.

The preference information of the present invention includes one or more pieces of request bandwidth information, delay difference information, charge information, information of a packet loss rate per unit time, cell information of a wireless communication medium. After a path used by a flow is determined, the communication managing portion notifies the application of the flow information including at least a bandwidth allocated to the flow represented by a numeric value, and the application selects contents based on the allocated bandwidth.

Effect of the Invention

According to the present invention, one or more data flow on a communication terminal can select a path reflecting a preference of a user or an application for each data flow, i.e., a combination of the own communication medium and one or more counterpart communication media. This can be performed without being known by the counterpart the preference information. The application can select contents appropriate for a transmission rate available to the path to be used.

BRIEF DESCRIPTION OF THE DRAWINGS

In FIG. 3, (A) is a view of an example of flow information, (B) and (D) are views of communication media information, and (C) is a view of path information.

FIG. 4 is a view of an example of determined path information.

FIG. 5 is a view of an example of allocated bandwidths.

FIG. 6 is a view of an example of a combination table.

FIG. 7 is a view of an example of MIP custom information.

FIG. 9 is a sequence view of FIG. 8.

FIG. 10 is a view of an example of flow information.

In FIG. 11, (A) and (C) are views of an example of communication media information and (B) is a view of path information.

FIG. 12 is a view of an example of determined path information.

FIG. 13 is a view of an example of a combination table.

FIG. 14 is a view of an example of allocated bandwidths.

FIG. 15 is a view of an example of a score calculation table (flow 1).

FIG. 16 is a view of an example of a score calculation table (flow 2).

FIG. 17 is a view of an example of a score table.

FIG. 18 is a view of an example of a bandwidth allocation table.

FIG. 19 is a view of an example of a score calculation table (flow 11-1).

FIG. 20 is a view of an example of a score calculation table (flow 11-2).

FIG. 21 is a view of an example of a score table.

In FIG. 22, (A) is a view of an example of the priority order of paths, (B) is a view of selected combinations, and (C) is a view of network states.

FIG. 23 is a view of an example of a MIP custom table.

FIG. 24 is a view of a configuration example of IP packets.

In FIG. 25, (A) is a view of examples of the priority order of paths, (B) is a view of selected combinations, and (C) is a view of network states.

FIG. 28 is a sequence view of FIG. 27.

In FIG. 29, (A) is a view of examples of flow information, (B) and (D) are views of communication media information, and (C) and (E) are views of path information.

FIG. 30 is a view of an example of bandwidths allocated to flows.

FIG. 31 is a view of an example of a MIP custom table.

FIG. 34 is a view of examples of flow information.

In FIG. 35, (A) is a view of an example of path information, (B) is a view of communication media information, and (C) and (D) are views of combinations of flows and paths.

In FIG. 36, (A) is a view of an example of path information, (B) is a view of communication media information, and (C) and (D) are views of combinations of flows and paths.

FIG. 37 is a view of an example of a combination table.

FIG. 38 is a view of an example of combinations of flows and paths.

FIG. 39 is table examples for a packet generation rule.

FIG. 44 is an example of flow information (terminal 10 to terminal 12).

FIG. 45 is an example of flow information (terminal 10 to terminal 11).

FIG. 46 is a view of path information and communication medium information (terminal 10 to terminal 12).

FIG. 47 is a view of path information and communication medium information (terminal 10 to terminal 11).

FIG. 48 is a view of an example of determined path information.

FIG. 49 is a view of an example of determining the priority order of flows.

FIG. 51 is a view of an example of score tables.

FIG. 52 is a view of an example of selected paths.

FIG. 53 is a view of an example of rules of transmission packets.

FIG. 54 is a view of an example of a network state.

FIG. 55 is a view of an example of flow information.

In FIG. 56, (A) is a view of an example of communication media information, (B) is a view of path information, and (C) is a view of communication media information.

FIG. 58 is a view of an example of score tables.

FIG. 59 is a view of an example of a combination table.

FIG. 60 is a view of an example of the priority order of combinations.

FIG. 61 is a view of an example of a network state.

FIG. 62 is a view of an example of a network state.

Figure 1:
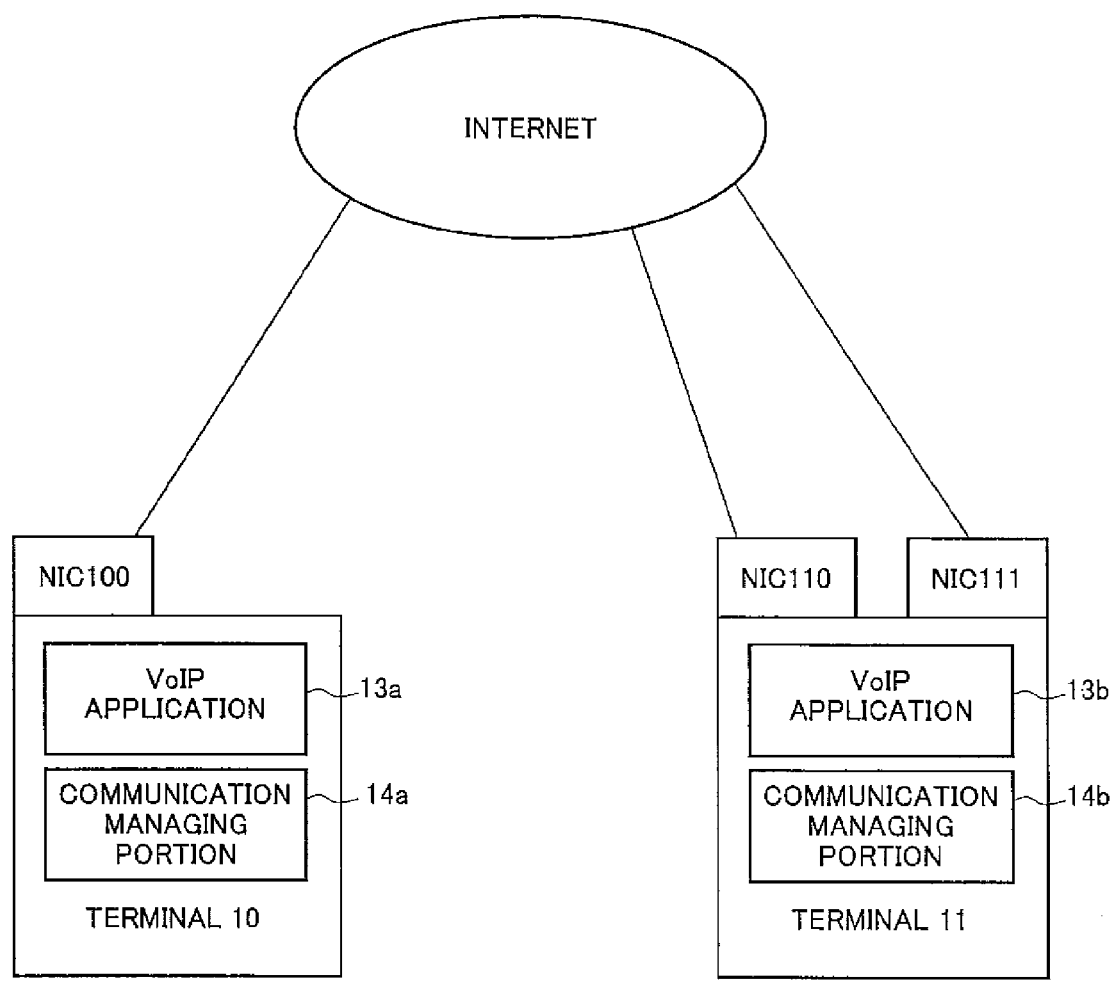
FIG. 1 is a typical view of a system configuration example for explaining a first embodiment of the present invention.

Explanation of Reference Numerals 10, 11, 12 . . . terminal; 13a, 13b, 13c . . . VoIP application; 14a, 14b, 14c . . . communication managing portion; 15a, 15b . . . TV telephone application; 16a, 16b, 16c . . . MobileIP managing portion; 17a, 17b . . . video viewing application; 18 . . . video distribution server.

PREFERRED EMBODIMENTS OF THE INVENTION

The present invention presents a means of selecting a combination of CoAs (the counterpart CoA and the own CoA) in a mobility protocol such as the MobileIP for each flow with reference to preference information when transmitting/receiving one or more flows (data flows) through one or more paths (communication paths) among a plurality of communication terminals. Specifically, flows are applied to possible paths to calculate scores. When this is performed, in consideration of repeated combinations of flows and paths, scores are calculated for the combinations and transmitted to the counterpart terminals, and approval is obtained to select the optimum path. As a result, the CoA suited to the preference can be selected among a plurality of communication terminals.

For example, in communication between two terminals, a communication terminal A (e.g., a caller side) transmits communication medium information to a counterpart communication terminal B (e.g., a called side), and the communication terminal B generates path information merged the communication medium information of both parties and sends back the path information to the communication terminal A. The communication terminal A and the communication terminal B comprehend a network state of each path between the communication terminal A and the communication terminal B, and the communication terminal A scores and ranks the matching of paths to a flow request and transmits the ranks and scores to the communication terminal B. The communication terminal B determines scores of the paths in accordance with its own preference at the same time and adds the ranks and scores transmitted from the communication terminal A to select an optimum path. The selected path is returned to the communication terminal A, and the communication terminal A and the communication terminal B grasp an optimum bandwidth to an application based on the information of the selected path.

(First Embodiment)

Figure 2:
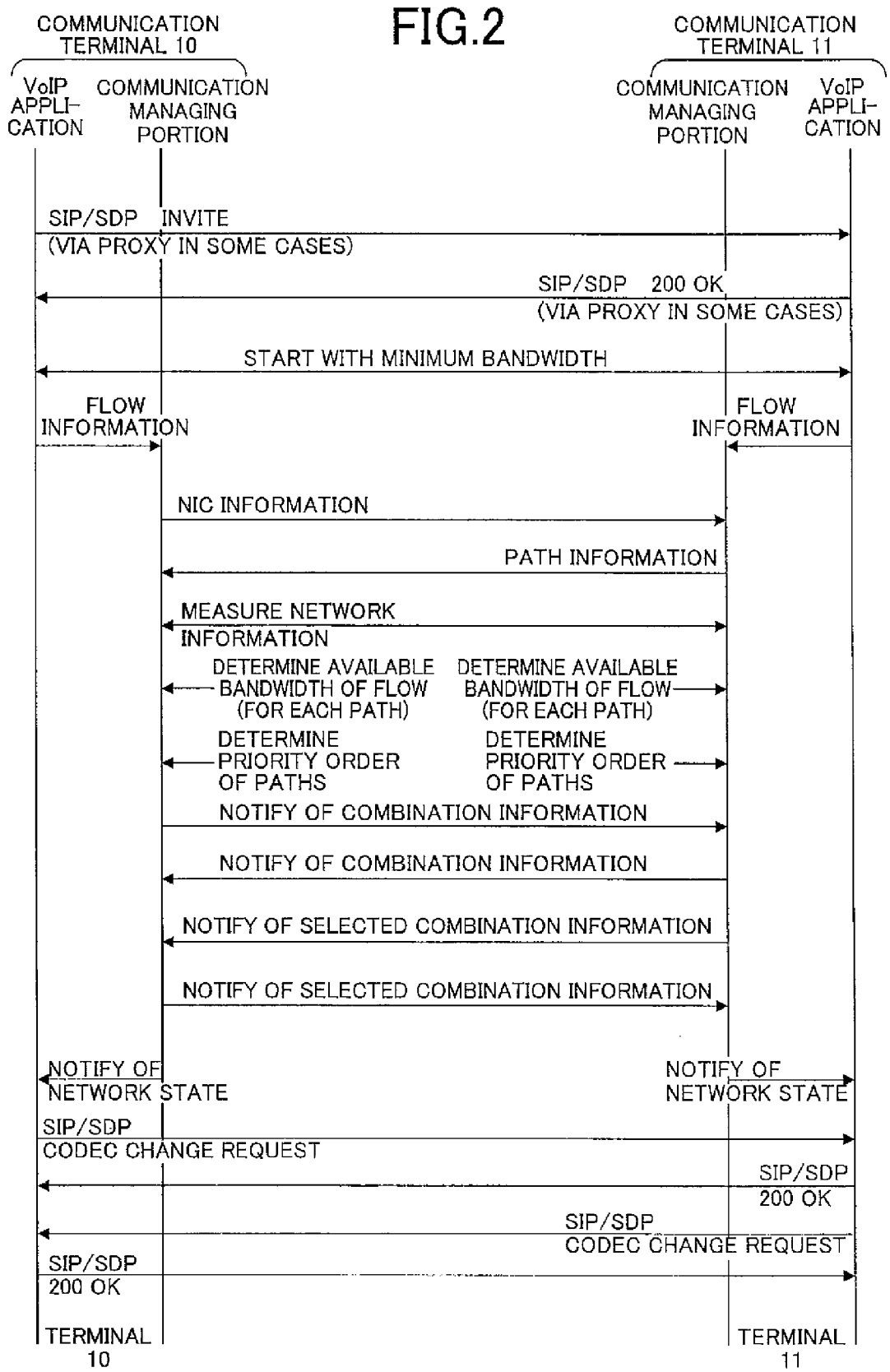
FIG. 2 is a sequence view of FIG. 1.

A first embodiment will be described with reference to FIGS. 1 to 7. FIG. 1 shows a diagrammatic view of a system configuration example and FIG. 2 shows a sequence view. The first embodiment includes a terminal 10 and a terminal 11 in communication with each other and comprises communication managing portions 14a, 14b and VoIP (Voice over Internet Protocol) applications 13a, 13b, which are implemented on the terminal 10 and the terminal 11. The terminal 10 is connected to the internet through a communication medium NIC100 and the terminal 11 is connected to the internet through a communication medium NIC110 and a communication medium NIC111.

Currently, a call control protocol used in the VoIP mainly is the SIP (Session Initiation Protocol). When using the SIP, information of the flow for the counterpart terminal is not determined until reception of the SDP (Session Description Protocol) is completed. After the call control, i.e., the transmission/reception of the SDP is mutually completed and the flow information is determined, the VoIP application 13a delivers the flow information to the communication managing portion 14a. In this embodiment, it is assumed that the communication starts at the narrowest bandwidth (8 kbps) of the SDP, for example. The flow information (FIG. 3(A)) includes at least a destination address (Dst Addr), a source address (Src Addr), a destination port (Dst Port), an at least necessary bandwidth BW (min), a bandwidth BW (max) required for the highest quality.

The destination and source addresses are home addresses of the MobileIP in MobileIP support terminals. When using other third-layer mobility protocol, addresses acting as a terminal identifier of each protocol are used. For example, in the case of the Lin6 (a mobility support third-layer protocol proposed by Teraoka et al.) ensuring migration transparency, Lin6 general-purpose ID is used, and in the case of the IPIP (a mobility support third-layer protocol proposed by NTT DoCoMo, Inc.), IPha is used. The flow information (FIG. 3(A)) is also delivered to the communication managing portion 14b in the terminal 11 at the same time. An application then notifies that which one should act as an initiator in the communication managing portion 14b.

In this embodiment, the VoIP application 13a of the terminal 10, i.e., a calling terminal notifies the own communication managing portion 14a that the terminal 10 is the initiator and of the flow information. Although the calling side (the terminal 10) of the VoIP application is the initiator in this embodiment, the called side (the terminal 11) of the VoIP application may be the initiator. Based on these pieces of information, the communication managing portion 14a of the terminal 10 transmits the own communication medium information (FIG. 3(B)), i.e., the information of the communication medium NIC100 to the communication managing portion 14b of the counterpart terminal 11 to generate a path for the counterpart terminal. The terminal 11 generates path information (FIG. 3(C)) from the received communication medium information and the own communication medium information and transmits the path information to the terminal 10. Upstream and downstream paths are recognized as different paths. The path information includes the information (FIG. 3(D)) of the communication media of both terminals.

A network situation is examined to fill in the lacking data (e.g., bandwidth BW of FIG. 3(C)) in the path information. In this investigation, for example, various network situations may be accumulated in a database to acquire the network information from the database, or the network information may be acquired by END-END measurement, or it is no problem to use other techniques. In this embodiment, the END-END measurement is performed. After the path information is acquired, the terminal 10 measures the network state between the terminal 11 to acquire the network information. This fills in the available bandwidth BW in the path information (FIG. 4).

As a result, it is required to determine which of paths 1 and 2 should be utilized for a flow 1 and which of paths 3 and 4 should be utilized for a flow 2. The present invention is premised on a multi-home environment and the upstream and downstream paths are determined as different paths. Similarly, the desired path is selected for the flow 1 by the terminal 10 and for the flow 2 by the terminal 11 in accordance with the preference information. That is, it becomes possible to determine which is better to use the communication medium NIC110 of the terminal 11 or to use the communication medium NIC111 for each flow.

In this embodiment, it is convenient to use the communication medium NIC111 of the terminal 11 for the flow from terminal 11 to the terminal 10 and is convenient to use the communication medium NIC110 for the flow from terminal 10 to the terminal 11. Since users receiving data have the preferences as described above, the user of the terminal 10 should be able to make the selection for the flow 1, and the selection for the flow 2 should be made in accordance with the preference of the user of the terminal 11. The preference is, for example, information such as whether a priority is given to delay (smallness of the amount) or sound quality in the VoIP and may be set in advance or may be selected on a selection screen etc., a each time.

In the embodiment, that the preference information is set in advance. In this case, the preference information is processed as numeric values and is calculated by considering weight at scoring. This information corresponds to numeric values added on the lower sides of BW (min) and BW (max) of FIG. 3(A), such as (*1) and (*3). For the selection of the path including the preference information, first, bandwidths must be known which are allocated to the flow when using the paths. This may be achieved by various methods.

For example, in a first possible method, if a path is utilized, a bandwidth obtained by dividing the bandwidth of the path obtained through END-END measurement by the number of flows may be allocated as a bandwidth allocated to a flow. In a second possible method, when the path is utilized, each flow has a right of a half of the bandwidth of the path acquired by the END-END measurement in order of flow priority. That is, in the second method, a flow with a lower priority has a right to acquire only a half bandwidth of a flow with a higher priority. Such a bandwidth is allocated as a bandwidth allocated to a flow. Although other methods may be used, it is assumed that a bandwidth is allocated to each flow when the flow is mapped to the path.

In the embodiment, a bandwidth allocated to each flow is known. FIGS. 5(A) and 5(B) show an example of bandwidths allocated when the flows are allocated to paths. FIG. 5(A) and 5(B) are possessed by the terminal 10 and the terminal 11, respectively.

The communication managing portion 14a of the terminal 10 performs the scoring based on the preference information of the VoIP application 13a. For example, the scoring is assumed to be performed in conformity with the following rules. If a bandwidth mapped to a flow satisfies a condition, the score is 100 points, and if not, the score is 90 points. The scores are weighted and summed to form a score of a combination as the score of the entire path. Although it is not exactly a combination since only one downstream flow exists in the embodiment, two patterns exist which are a combination formed by mapping the flow 1 to the path 1 and a combination formed by mapping the flow 1 to the path 2, and it is considered on the terminal 10 side which one is appropriate. With regard to two patterns of combinations formed by mapping the flow 2 to the path 3 and mapping the flow 2 to the path 4, it is considered on the terminal 11 side which one is appropriate.

First, the terminal 10 generates and transmits a combination table shown in FIG. 6(A) to the terminal 11. In FIG. 6(A), the scores happen to be the same. It can be said in a certain sense that this is a declaration of intent that either combination makes no difference for the terminal 10. As a result, the terminal 11 can select a combination according to its preference. It is assumed here that a combination processed earlier in a program is selected (which is assumed to be "combination 1"). In the case of the same scores, the terminal 11 selects the "combination 1" and transmits the result to the terminal 10. Almost concurrently, the terminal 11 generates and transmits a combination table shown in FIG. 6(B) to the terminal 10.

Since no preference information exists for the upstream in the embodiment, the "combination 1", i.e., the path 3 is selected and returned to the terminal 11 as a selected combination. When returning these pieces of information, a packet generation rule exists for the terminal 10 and the terminal 11, and the rule is that the terminal 10 has the information shown in FIG. 7(A) and that the terminal 11 has the information shown in FIG. 7(B). The NIC information is related with IP addresses in FIG. 3(D), and the rule is that the terminal 11 creates a packet using CoA110 as a source address, NIC110 as a source IF, and CoA100 as a destination address for the flow 1. For the flow 2, the terminal 10 creates a packet using CoA100 as a source address, NIC100 as a source IF, and CoA110 as a destination address.

With the information as shown in these figures being generated, each terminal can determine by itself from which IF the packet is sent and to which CoA address of the counterpart the packet is created for each flow. With the paths used by the flows being determined, available contents can be selected for the flows. Although the communication is initiated with 8 kbps of codec, 64 kbps of codec can be utilized since the path is determined. Since a bandwidth of a header is added to a bandwidth necessary for contents, if the measurement result is 70 kbps, 64 kbps cannot be mapped in some situations. Although the contents may be selected in consideration of these situations, detailed description is omitted in the present invention.

When the communication path is determined, the terminal that receives data is notified of on available bandwidth due to the determination of the communication path. As a result, the terminal that receives data performs a codec change request to the counterpart terminal as the call control on the application and requests the transmitting terminal to change the codec for changing the contents to be received. An example that the transmitting side notifies the receiving side of a network state will be described in a second embodiment later.

As one example of the scoring method of the present invention, for example, the following method may be used. When a flow score=S, a reference level value=$\alpha$, and a score for path characteristics=X, and then "S=$\Sigma \alpha X$". Since the score increases as the preference level increases, "S=$\Sigma X^{\alpha}$" or "S=$\Sigma(\log \alpha) \cdot X$" may also be possible. However, a lower preference level may be considered important and given a higher score or, contrary, a lower score may be considered as conforming to the preference, and determination must be made of whether consistency exists and whether the greater conformance to the user's preference is obtained. In the present invention, an example of using "S=$\Sigma \alpha X$" for the scoring will be described. The preference level indicates a value (=numeric value) of preference for each item in the flow information, and the preference information indicates a group of the preference levels of the values for the entire flow information.

(Second Embodiment)

Figure 8:
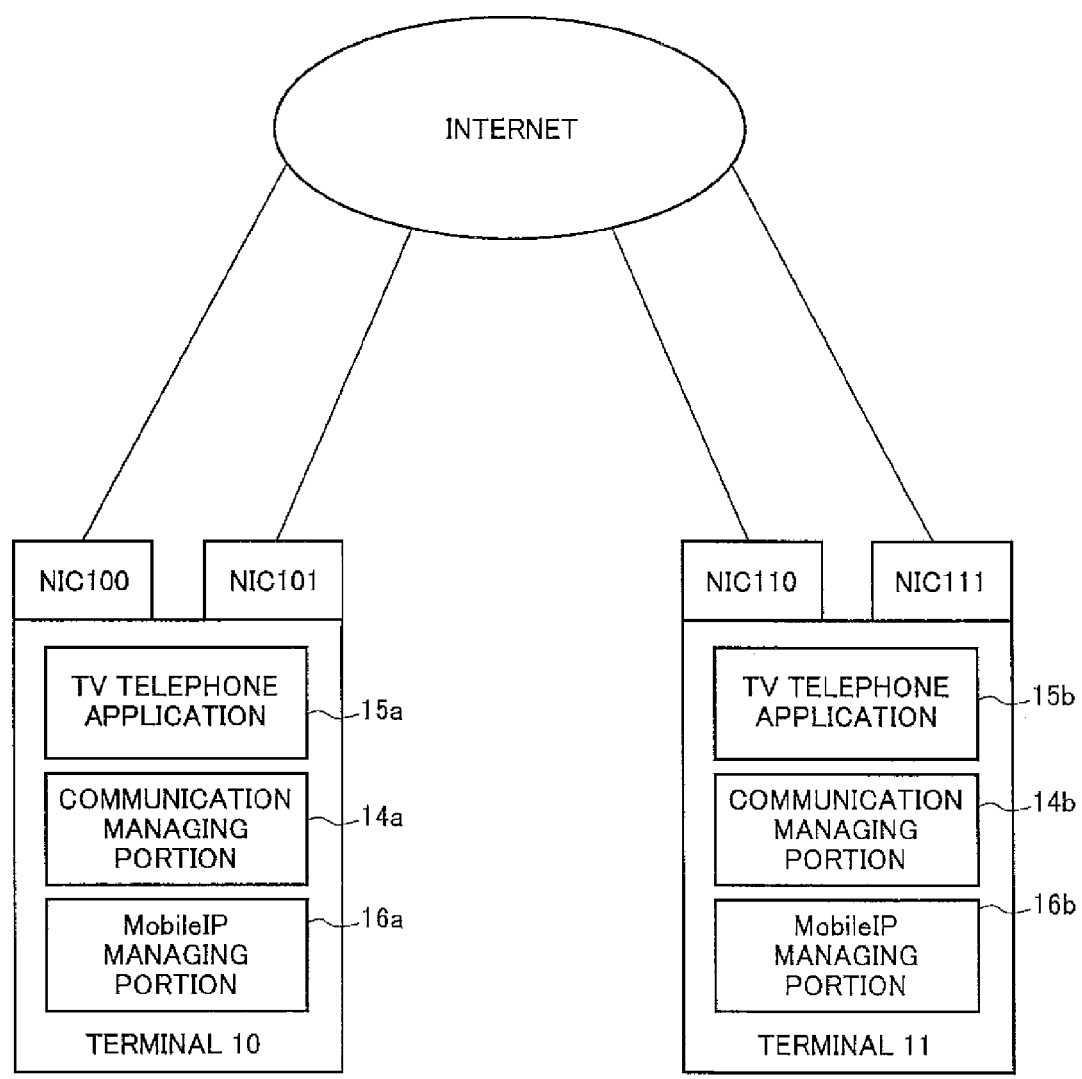
FIG. 8 is a typical view of a system configuration example for explaining a second embodiment of the present invention.

The second embodiment will be described with reference to FIGS. 8 to 26. FIG. 8 shows a typical view of a system configuration example and FIG. 9 shows a sequence view. The second embodiment is an example of TV telephone, which includes two flows for each of the upstream and the downstream, and notification of a network state is given from the transmitting side. The terminal 10 and the terminal 11 exist; the terminal 10 is connected to the internet through communication media NIC100 and NIC101; and the terminal 11 is connected to the internet through the communication medium NIC110 and the communication medium NIC111. This embodiment comprises by the communication managing portions 14a, 14, TV telephone applications 15a, 15b, and MobileIP managing portions 16a and 16b, which are implemented in the terminal 10 and the terminal 11.

Currently, a call control protocol used in the VoIP is mainly the SIP. When using the SIP, information of the flow for the counterpart terminal is not determined until reception of the SDP is completed. After the call control, i.e., the transmission/reception of the SDP is mutually completed and the flow information is determined, the TV telephone application 15a gives the flow information to the communication managing portion 14a. In this embodiment, a telephone call starts with the lowest codec (no image) after the first SDP is exchanged.

Almost concurrently with the start of the telephone call, the flow information is given from the TV telephone applications 15a and 15b to the communication managing portions 14a and 14b. The communication managing portion 14a also receives the information indicating whether the terminal is initiator. In the embodiment, it is indicated that the initiator is the terminal 11, which is a called terminal. This is because it may be convenient to start from the SDP receiving side in consideration of efficiency since the terminal 11 receives the SDP packet first.

FIG. 10(A) shows one example of the flow information (including preference information) in this case. Bandwidths BW1 to BW3 are bandwidths linked to codec that can be supported by applications, and the preference information for each codec is "*4 Must", and the like. "Must" is a preference level used when it means as "this is a Must" as it literally means. The preference information in this example includes a bandwidth, a delay difference, a cost (upstream), a cost (downstream), stability, and mobility.

Briefly describing the preference information, the bandwidth BW is the same as the above description and will not be described. Although it is no problem to use an absolute delay time for the delay difference when the delay can exactly be measured, if this cannot be done, the delay difference is a request related to a time acquired by defining the shortest delay of incoming paths to itself as "0" and obtaining a difference relative to that path. This can be measured by executing the following test, for example.

By obtaining a difference between a time required for NIC100→NIC110→NIC100 and a time required for NIC101→NIC110→NIC100, a time difference can be known between NIC100→NIC110 and NIC101→NIC110. By repeating this operation for some times, a delay difference for one direction can be obtained. If the terminal 10 and the terminal 11 are equipped with GPS (Global Positioning System), and the like, an absolute delay can be obtained with fairly good accuracy, and it may be said that using this absolute delay is more desirable.

However, it is not important whether the absolute delay or the delay difference is used; what is important is to use such a parameter as the preference information; and the embodiment is shown with an example of using the delay difference. The cost (upstream) is a preference related to transmission data to the counterpart and, unlike the above preferences information this is a preference related to transmission data to the counterpart and will be described later in detail.

The cost (downstream) is a preference for the charging to downstream data. Although a lower cost is more beneficial for a user, of course, since it may be desirable to use a higher-quality path even if the cost is high, such preferences are reflected. With regard to the stability, this is stability of a communication path and is, for example, information indicating that fluctuations are small. Lastly, the mobility may be considered as a preference related to a size of a cell. For example, when moving at high speed, the preference for the mobility becomes high.

In the terminal 11, a flow 10-1 is an upstream flow and therefore, preference information exists only for the cost (upstream). For the flow 10-1, it is desirable that this cost is low, and the preference level is *1. Similarly, since a flow 10-2 is an upstream flow, it is desirable that the cost (upstream) is low, and the preference level is *5. The value of the preference level is used at the time of scoring later.

With regard to a flow 11-1, since this is a flow from the terminal 10 to the terminal 11 (i.e., downstream flow), the destination port is 7080 and because of a codec type available to the application and user's preferences, the setting is as follows. It is "Must" that the 8-kbps codec is available and if a bandwidth allocated to the flow is equal to or less than 8-kbps when using the path, it is determined that communication is impossible. The codec of which bandwidth equals to 64 kbps or more is at the preference level of *4. The delay difference is preferred to be small and the preference level is *5. Since the flow 11-1 is the downstream flow and no preference information exists for the upstream cost, the field is filled with a hyphen. The downstream cost in this example has the preference level of *0, which indicates that the cost is not considered. The stability is preferred to be high and has the preference level of *1, and the mobility is also preferred to be high and has the preference level of *1.

Briefly describing a flow 11-2, this is a flow from the terminal 10 to the terminal 11 (downstream flow) as is the case with the flow 11-1. The destination port is 9080; the at least necessary bandwidth is 0 kbps, i.e., no data, which corresponds to the preference level of *0; and the available codecs are for 100 kbps and 500 kbps having the preference levels of *3 and *2, respectively. The delay difference has the preference level of *0, which indicates that the delay difference is not considered. The cost (upstream) is not considered. The cost (downstream) is preferred to be low and has the preference level of *5. The stability is preferred to be high and has the preference level of *1, and the mobility is also preferred to be high and has the preference level of *1.

These are the flow information including the preference information gives from the TV telephone application 15b to the communication managing portion 14b. Similarly, the terminal 10 utilizes the flow information including the preference information as shown in FIG. 10(B). Briefly, the flow 10-1 is a flow from the terminal 11 to the terminal 10 (i.e., downstream flow) and the destination port is 7080. The at least necessary bandwidth is 8 kbps; the preference level for the 64-kbps codec is *5; the delay difference is preferred to be small and has the preference level of *4; no value exists for the cost (upstream); the cost (downstream) has the preference level of *0; and the stability and the mobility are preferred to be high and have the preference levels of *1, respectively.

The flow 10-2 is a flow from the terminal 11 to the terminal 10 (i.e., downstream flow) and the destination port is 9080. The at least necessary bandwidth is 0 kbps and has the preference level of *0; the preference level for the 100-kbps codec is *3; the preference level for the 500-kbps codec is *2; the preference level is for the delay difference *0; no value exists for the cost (upstream); the cost (downstream) is preferred to be small and has the preference level of *3; and the stability and the mobility are preferred to be high and have the preference level of *1, respectively.

The flow 11-1 is a flow from the terminal 10 to the terminal 11 (upstream flow) with the destination port of 7080, and the preference exists only for the cost (upstream), which is preferred to be the smallest, having the preference level of *1. The flow 11-2 also is a flow from the terminal 10 to the terminal 11 (upstream flow) with the destination port of 9080, and the preference exists only for the cost (upstream), which is preferred to be the smallest, having the preference level of *5.

The above transmission and reception will be described in accordance with a sequence shown in FIG. 9. After receiving the call control of the TV telephone application 15a of the terminal 10, i.e., SIP/SDP INVITE, the flow information (FIG. 10(A)) is given to the communication managing portion 14b in the terminal 11. After receiving SIP/SDP 200 OK from the terminal 11, the flow information (FIG. 10(B)) is given to the communication managing portion 14a in the terminal 10. On this occasion, since the flow information is more likely to be given first in the terminal 11, when the flow information is given in the terminal 11, a notification is performed at the same time to indicate that the terminal 11 becomes the initiator. As a result, the terminal 11 transmits the own communication medium information to the terminal 10.

The communication medium information is shown in FIG. 11(A). After receiving the communication medium information, the terminal 10 creates the path information in the full-mesh with the own communication medium information merged, which are transmitted to the terminal 11 as the path information. In this embodiment, the path information has eight patterns including directions. FIG. 11(B) shows the path information and FIG. 11(C) shows the communication media information incidental to the path information. Although the path information data are shared by the terminal 10 and the terminal 11, FIG. 11(B) is not filled in with some data (BW (measurement)). These data are acquired from a server or acquired through a method of the END-END measurement. In this embodiment, an example of acquiring through measurement is shown.

The mobility corresponds to a lower one of the both communication media in the path. The costs have different values for the terminal 10 and the terminal 11. The path information filled in with these data is retained as the data shown in FIG. 12(A) in the terminal 10 and as the data shown in FIG. 12(B) in the terminal 11. The costs are charges for the paths and charges for the use of the NICs and are per-unit prices. As a result of completion of the path information, the communication managing portions 14a and 14b first consider combinations of flows and paths.

When a terminal wants to select a path for a downstream flow as described above, since all the downstream flows have the degree of freedom for freely selecting all the downstream paths, the number of repeated combinations are (the number of downstream paths) to the power of (the number of downstream flow). In this embodiment, the number of the combinations are $4^2=16$ patterns and FIG. 13 shows the combinations included in the terminal 10. The scoring is then performed for FIG. 13. Since the scoring is performed for the flows based on the allocated bandwidths, a bandwidth must be known which is allocated to each flow when selecting the combination.

For example, in a first possible method of knowing the bandwidth, when the path is utilized, a bandwidth obtained by dividing the path bandwidth obtained through END-END measurement by the number of flows may be allocated as a bandwidth allocated to a flow. In a second possible method, when the path is utilized, each flow has a right of a half of the path bandwidth acquired by the END-END measurement in order of flow priority. That is, in the second method, a flow with a lower priority has a right to acquire only a half bandwidth of a flow with a higher priority.

FIG. 14 shows the data filed in with allocated bandwidth as above. Once the bandwidths of the flows can be acquired, the scoring can be performed. The score is given to each flow and the scores are summed for each combination. For example, one example of the scoring will be described by taking a "combination 1" as an example. If 64 kbps or more of the bandwidth are applied to the flow 1, the score thereof is 100×5 (preference level for 64 kbps). In the case of 8 kbps or more and less than 64 kbps, the score is 80×5.

With regard to the delay difference, for example, 100 points are given to a reference path having a delay difference of 0 ms; 70 points are given to the slowest path; and the score is determined from a proportional calculation. As a result, the score for the delay difference is 85×4 (preference level for the RTT (Round-Trip Time) delay difference).

The cost has the preference level of *0 and, therefore, is not considered. With regard to the stability and the mobility, the scoring is performed in such a manner that 100 points are given for A, 90 points for B, 80 points for C, etc. FIG. 15C shows the score for each combination related to the flow 1. A score for a flow can be represented by "ΣαX".

With regard to the flow 10-2, the score is 80×3(preference level for 100 kbps)+80×2(preference level for 500 kbps) when the allocated bandwidth is less than 100 kbps, 100×3 (preference level for 100 kbps)+80×2(preference level for 500 kbps) when the allocated bandwidth is 100 kbps or more and less than 500 kbps, and 100×3(preference level for 100 kbps)+100×2(preference level for 500 kbps) when the allocated bandwidth is 500 kbps or more.

The RTT delay difference has the preference level of *0 and, therefore, is not considered, and assuming that the score of the cost is 100 points in the case of cost=0 and is reduced by two points each time the cost is increased by one, the score becomes 100×4 (preference level for the cost) in the case of the path with the cost=0 and 80×4 (preference level for the cost) in the case of the path with the cost=10. With regard to the stability and the mobility, the scoring is performed in such a manner that 100 points are given for A, 90 points for B, 80 points for C, etc. FIG. 16 shows the score of the flow 10-2 represented for each combination. From these results, it can be known that the total score of the "combination 1" of FIGS. 15 and 16 is 2020.

If all the subsequent scores are determined, it can finally be known that the score of the "combination 1" is the highest. FIG. 17 shows an example of combinations having the scores. FIG. 17 is transmitted in whole or in part to the terminal 11, and the terminal 11 takes the own upstream preference for the flows 10-1 and 10-2 (which is only the upstream cost) into account to finally select the path to be utilized.

Similarly, in the operation of the terminal 11, after the data of paths and flows are ready, the repeated combinations are considered to allocate a bandwidth to each flow for that case. FIG. 18 shows an example of the combinations. As is the description of the terminal 10, bandwidths are allocated for the terminal 11, and the scoring is performed for each flow of each combination to calculate the scores of the combinations. FIG. 19 shows the result for the flow 11-1; FIG. 20 shows the result for the flow 11-2; and FIG. 21 shows the result for the combinations. As a result, it is most preferable to select the "combination 3" on the side of the terminal 11.

The result of FIG. 21 is transmitted in whole or in part to the terminal 10, and the terminal 10 finally selects the path used for the flows 11-1 and 11-2. Arbitrariness can be introduced to select a part and, for example, a part can be selected in such a way that the communication media of the counterpart are limited. That is, on the terminal 10 side of FIG. 17, the "combination 1" is selected which has the highest score in the case of selecting the optimum one without considering the communication medium of the counterpart and in the case of limiting the communication medium of the counterpart to the NIC110 (=combinations using only the path 1 and 3) and the "combination 6" is selected which has the highest score among the combinations using only the NIC111 (combinations using only the path 2 and 4) to transmit these two combination to the terminal 11 (FIG. 22(A), path priority notification of FIG. 9).

The terminal 11 adds a score for the score (upstream) to the transmitted combinations. Since the terminal 11 has the flow information of FIG. 10(A), the preference level of the cost (upstream) for the flow 10-1 is *1 and the preference level of the cost (upstream) for the flow 10-2 is *5. Since the upstream costs of the paths 1 and 3 are 0s but the upstream cost of the paths 2 and 4 are 10s, the total cost is as shown in FIG. 22(B) and the "combination 1" is selected. The selected combination is transmitted from the terminal 11 to the terminal 10 (FIG. 22(C), selected combination in FIG. 9).

The terminal 11 transmits the flow 10-1 through path 1 and the flow 10-2 through path 1 as well. This setting must be set in the MobileIP managing portion 16b and this setting is shown in FIG. 23. As a result of this setting, a packet to the IP10 (=the terminal 10) and the destination port No. 7080 is emitted from the NIC110 and becomes IP100 as the destination CoA, using IP110 as the source CoA. Contents of the routing header type 2 and the destination option header are the home address that is the same as in the case with the MobileIPv6.

The header for the flow 10-1 is briefly represented in FIG. 24(A). The header for the flow 10-2 is briefly represented in FIG. 24(B). Since the terminal 11 transmits the selected combination information (FIG. 22(C)), it is determined that the flow 10-1 (audio) can be changed to the 64-kbps codec and that the flow 10-2 (image) can be changed to the 500-kbps codec. The communication managing portion 14b notifies the TV telephone application 15b of the information of the network state. As a result, the TV telephone application 15b in the terminal 11 determines that the codec can be changed and notifies the TV telephone application 15a in the terminal 10, i.e., the reception terminal, of the change of the codecs through SendOnly in SIP/SDP re-INVITE.

The TV telephone application 15a in the terminal 10 correspondingly permits the change of the codec through SIP/SDP 200 OK, ReceiveOnly. As a result, the both flows from the terminal 11 to the terminal 10 use the path 1 and are streamed through the use of bandwidths corresponding to the transmission paths. The terminal 11 similarly transmits a whole or part of FIG. 21 to the terminal 10.

In this case, if a part is transmitted, the transmission is performed with the counterpart communication media limited as well. The limiting conditions are that the counterpart communication media are not considered, that the paths are limited to only those using the NIC100, and that the paths are limited to only those using the NIC101. As a result, as shown in FIG. 25(A), the "combination 3" and the "combination 8" are selected and transmitted to the terminal 10 (path priority notification of FIG. 9). Based on the priority information transmitted from the terminal 11 and based on the own flow information (FIG. 10(B)), the terminal 10 takes the upstream cost into account to select the utilized path.

Figures 26, 27:
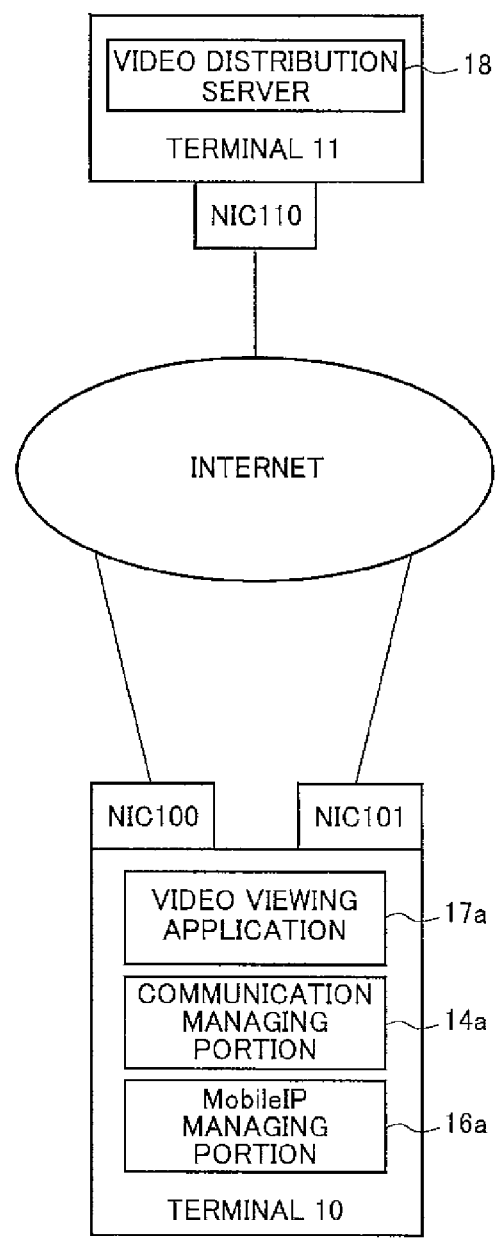
FIG. 26 is a view of an example of a MIP custom table.
FIG. 27 is a diagrammatic view of a system configuration example for explaining a third embodiment of the present invention.
Figure 32:
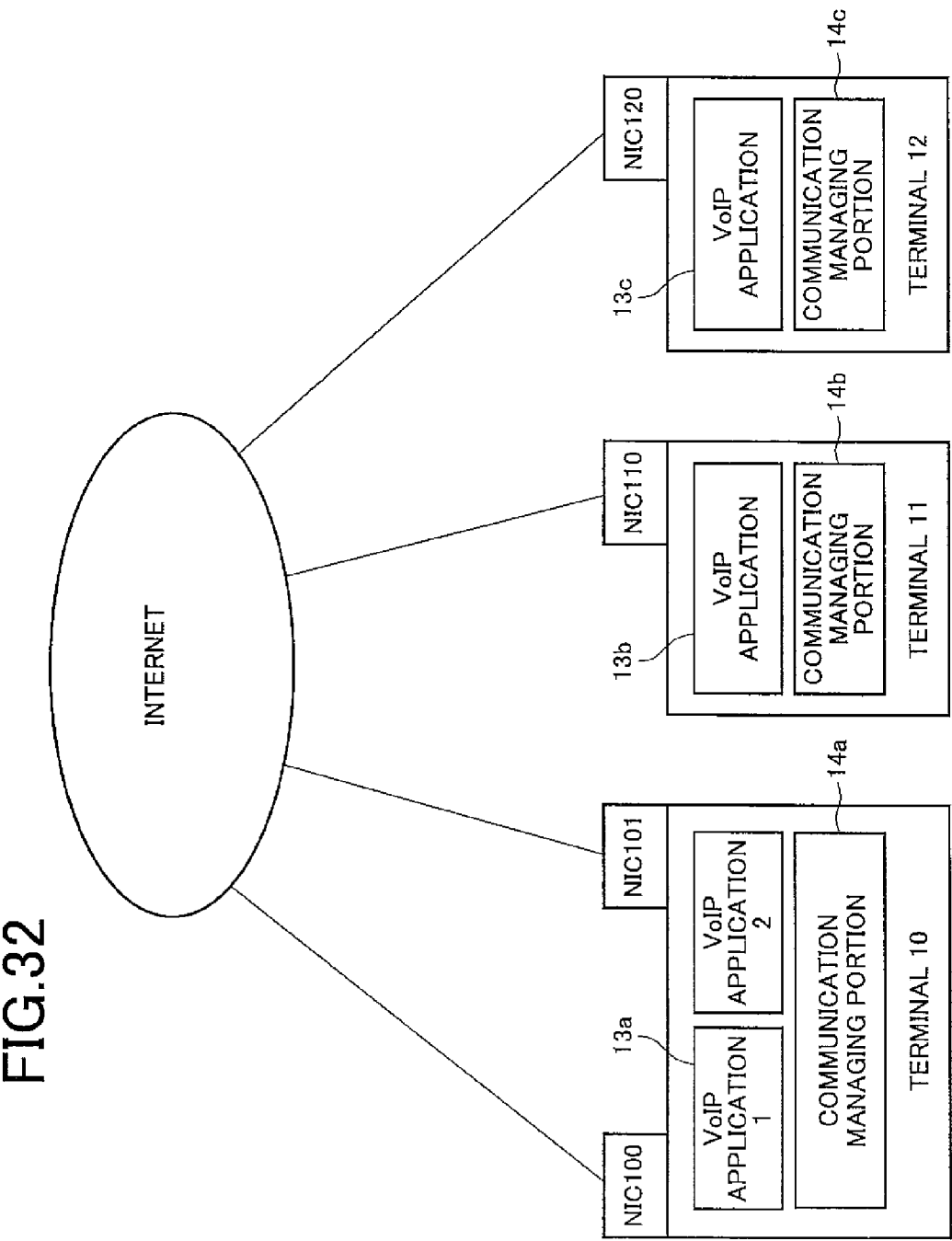
FIG. 32 is a diagrammatic view of a system configuration example for explaining a fourth embodiment of the present invention.
Figure 33:
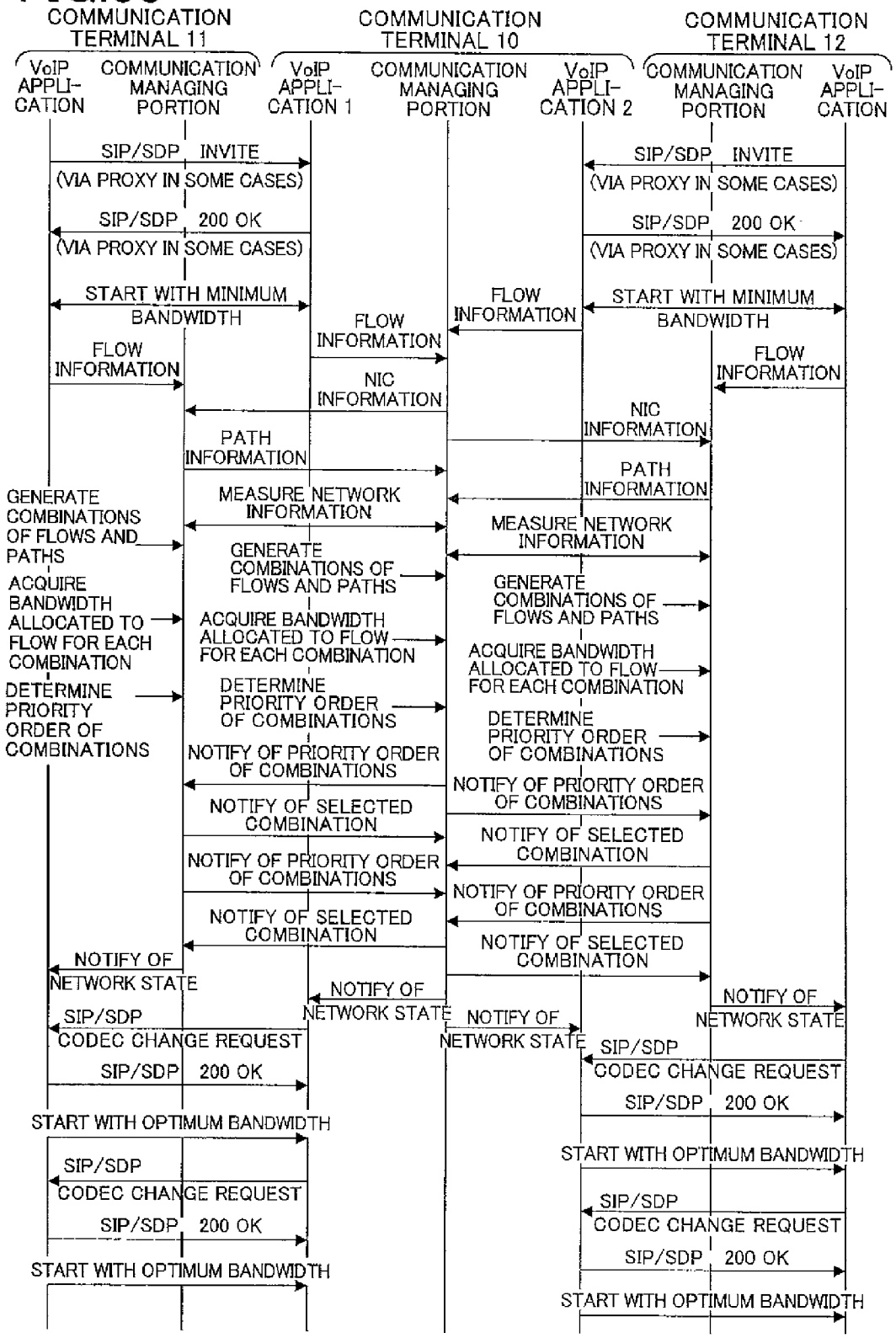
FIG. 33 is a sequence view of FIG. 32.

According to this, FIG. 25(B) is acquired in the same manner as in the case for the terminal 11 described above, in this way. As a result, the "combination 1" is selected and the selected combination of FIG. 25(C) is transmitted to the terminal 11. Since the selected combination is determined, the terminal 10 determines the path for the flow to the terminal 11 and gives the parameters as shown in FIG. 26 to the MobileIP managing portion 16a. As a result of this setting, a packet to the IP11 (=the terminal 11) and the destination port No. 7080 is sent out from the NIC100 and the destination CoA becomes IP111 using IP100 as the source CoA.

A packet to the IP11 (=the terminal 11) and the destination port No. 9080 is sent out from the NIC100 and in the destination CoA becomes IP111 using IP100 as the source CoA. These packets are briefly shown as FIG. 24(C) and FIG. 24(D) and are different in the destination addresses and ports.

As a result of the difference in the destination addresses, the communication medium arriving at the terminal 11 can be distinguished. Since the communication to the application is performed as the HoA (=IP11) based on the MobileIP in the terminal 11, if the path is switched, the application can continuously be operated. Since the available bandwidth is determined in the terminal 10 transmitting the selected path, the communication managing portion 14a notifies the TV telephone application 15a of the network state.

As a result, the TV telephone application 15a in the terminal 11 determines that the codec can be changed and notifies the TV telephone application 15b in the terminal 11, i.e., the receiving terminal, of the change of the codec through SendOnly in SIP/SDP re-INVITE. The TV telephone application 15b in the terminal 11 correspondingly permits the change of the codec through SIP/SDP 200 OK, ReceiveOnly. As a result, the flows from the terminal 10 to the terminal 11 use the path 5 for audio and the path 7 for images and are streamed through bandwidths corresponding to the transmission paths, and the both flows can use paths different from each other for transmission.

(Third Embodiment)

A third embodiment will be described with reference to FIGS. 27 to 31. As shown in a typical view of a configuration example of FIG. 27 and a sequence view of FIG. 28, this embodiment comprises a video distribution server 18 of the terminal 11, and a video viewing application 17a, the communication managing portion 14a, and MobileIP managing portion 16a, which are implemented in the terminal 10. The video distribution server 18 (the terminal 11) is connected to the internet through the NIC110, and the terminal 10 is connected to the internet through the NIC100 and the NIC101. This embodiment only includes data from the terminal 11 toward the terminal 10 which may have three types, i.e., 2 Mbps, 3 Mbps, and 4 Mbps. First, the terminal 10 acquires flow information (including preference information) using RTSP (Real Time Streaming Protocol), HTTP (Hyper Text Transfer Protocol), etc.

Although this is not necessarily acquired from the terminal 11, the source address in the flow information (including the preference information) is the terminal 11, which is the video distribution server. FIG. 29 (A) shows the acquired flow information (including the preference information). In this embodiment, only the bandwidth data are shown for the simplicity of description. As shown, the at least necessary bandwidth and the fully necessary bandwidth are equal in all the flows. After acquiring the flow information, the terminal 10 transmits the own communication medium information (FIG. 29(B)) to the terminal 11. The terminal 11 adds the own NIC information to transmit the path information (FIG. 29(C)) including the NIC information (FIG. 29(D)) to the terminal 10. Hyphens are used for unnecessary data because of one-way communication. To acquire the lacking data after acquiring the path information, the terminal 10 accesses a database to acquire the network information (bandwidth BW). FIG. 29(E) shows the path information with the full results.

Since the path information is acquired, the terminal 10 generates a table of repeated combinations of flows and paths. By further allocating bandwidths to the combinations, a result shown in FIG. 30 can be acquired. In this example, any one of the flows is unusable and is marked as NG in all the combinations except the "combination 2". As a result, only the "combination 2" becomes the path priority order, which is transmitted to the terminal 11. The terminal 11 accepts the priority order as it is and transmits the path with the priority order to the terminal 11 as the path to be used.

Since this leads to determination of the path for transmission data in the terminal 11, parameters as shown in FIG. 31 are given to the MobileIP managing portion 16a. As a result, communications can be performed through the path 1 for the flows 1 and 2 and through the path 2 for the flow 3. As a result of acquiring the utilized path, the terminal 10 can use all the flows, which are respectively set up in the server for communications in 2M, 3M, and 4 Mbps, and the reproduction is tried to start the communications.

(Fourth Embodiment)

A fourth embodiment will be described with reference to FIGS. 32 to 39. This embodiment is an example of implementing transmission/reception among three or more communication terminals rather than transmission/reception between two communication terminals of the first embodiment. As shown in a typical view of a system configuration example of FIG. 32 and the sequence thereof shown in FIG. 33, the terminal 10, the terminal 11, and the terminal 12 exist. The terminal 10 is connected to the internet through the communication media NIC100 and NIC101; the terminal 11 is connected to the internet through the communication medium NIC110; and the terminal 12 is connected through a communication medium NIC120. This system comprises the terminals 10, 11, 12, and the communication managing portions 14a, 14b, 14c and the VoIP applications 13a, 13b, 13c which are implemented in the terminals.

As in the first embodiment, a call control protocol used in the VoIP is mainly the SIP, and when using the SIP, information of the flow for the counterpart terminal is not determined until reception of the SDP is completed. After the call control, i.e., the transmission/reception of the SDP is mutually completed and the flow information is determined, the VoIP application gives the flow information to the communication managing portion. In this embodiment, the communication starts (data transmission starts) at the narrowest bandwidth (8 kbps) after receiving the SDP.

Since the information of the SDP is acquired (the SDP information includes available codec information and the IP address of the END terminal), the VoIP application can generate the flow information (including the preference information). After the generated flow information is determined in each terminal, the VoIP application gives the flow information to the communication managing portion. FIGS. 34(A) and 34(B) show the flow information given in the terminal 10; FIG. 34(C) shows the flow information given in the terminal 11; and FIG. 34(D) shows the flow information given in the terminal 12. In each terminal, the counterpart is identified and managed through DstAddr or SrcAddr. Therefore, if the counterpart is different, it is no problem if flow numbers or path numbers overlap (see FIGS. 35(A) and 36(A)).

In the terminal 10, the flow information is separately acquired from two VoIP applications 13a1 and 13a2. Since these pieces of information arrive at different timings, the communication managing portion 14a receives the information one by one. Although the communication managing portion 14a starts an operation each time one piece of the flow information is received and basically runs a sequence from the beginning if a second or later flow information is acquired, the path information is not newly created and only modified if the path information has been generated.

For example, as described in the first embodiment of FIGS. 1 and 2, if the terminal 10 and the terminal 11 are already in communication and share the path information after the completion of the sequence, the communication medium information is not newly transmitted, and a path is created for newly added communication to (a terminal) and the sequence progresses. In the meantime, for the communication between the terminals already having the path, it is determined whether the path information (particularly, a portion related to the bandwidth available to the path) is necessary to be updated, and if necessary, a path information update message is transmitted.

As a result, the terminal 10 can generate paths to the terminal 11 and the terminal 12 to communicate with. FIG. 35(A) shows the path information for the terminal 10 and the terminal 11 and FIG. 35(B) shows the communication medium information included in the path information. Combinations of flows and paths are generated between the terminal 10 and the terminal 11. Since one downstream flow exists in this embodiment, the number of combinations is equal to the number of paths. FIG. 35(C) shows the combinations included in the terminal 10 and FIG. 35(D) shows the combinations included in the terminal 11. Similarly, for the terminal 10 and the terminal 12, FIG. 36(A) shows the path information and FIG. 36(B) shows the communication medium information included in the path information. FIG. 36(C) shows the combinations included in the terminal 10 and FIG. 36(D) shows the combinations included in the terminal 12.

The terminal 10 includes the combinations for the communication with the terminal 11 (FIG. 35(C)) and the combinations for the communication with the terminal 12 (FIG. 36(C)). It is assumed that the terminal 11 and the terminal 12 communicate only with the terminal 10. Since the terminal 11 and the terminal 12 communicate only with the terminal 10, the same process as that in the first embodiment may be executed. That is, combinations are generated for the downstream flows and one or more suitable combinations are selected therefrom.

On the other hand, since terminal 10 is in communication with the terminal 11 and the terminal 12, the terminal itself must allocate paths used by flows and bandwidths in consideration of the available bandwidths. Combinations are generated for the downstream flows (FIG. 37(A)) and the most suitable one is selected. From the result, the combination for each terminal is transmitted to the counterpart terminal. This is shown in FIG. 37(B), and the "combination 1" and the "combination 2" are selected for the terminal 11 and the terminal 12, respectively. These combinations are respectively transmitted to the counterparts and approvals are obtained from the counterpart terminals to determine paths used by the flows.

As a result of the determination, the communication managing portion 14a can allocate bandwidths to the flows and notifies the applications 13a1 and 13a2 of the allocated bandwidths. As a result, the application determines the necessity of the codec change, and if it is determined that the change is "necessary", the application notifies the counterpart applications 13b and 13c that the change is necessary. Describing in a little more detail, the terminal transmits the "combination 1" to the terminal 11 and the "combination 2" to the terminal 12. It is assumed that each of the terminals 11 and 12 returns OK.

As a result, in the flow from the terminal 11 to the terminal 10 of the communication between the terminal 10 and the terminal 11, the "combination 1", i.e., the path 1 (a path from the NIC110 of the terminal 11 reaching to the NIC100 of the terminal 10) is used. In the flow from the terminal 12 to the terminal 10 of the communication between the terminal 10 and the terminal 12, the "combination 2", i.e., the path 2 (a path from the NIC120 of the terminal 12 reaching to the NIC101 of the terminal 10) is utilized. As a result, the bandwidths allocated to the flows are determined.

For example, it is assumed that 64 kbps are allocated to the flow 1 between the terminal 10 and the terminal 11 and are also allocated to the flow 1 between the terminal 10 and the terminal 12. The communication managing portion 14a notifies the VoIP applications 13a1 and 13a2 of this result. As a result, the VoIP applications 13a1 and 13a2 request the counterpart terminals to change the utilized codec. This is performed thorough re-INVITE of SIP signaling. Since only the terminal 10 becomes the counterpart of the terminal 11, this situation is equivalent to that in the first embodiment.

That is, the terminal 11 generates combinations of the flows and the paths for the communication with the terminal 10 (FIG. 38(A)) and selects and transmits one with the highest score (combination 2) to the terminal 10. The terminal 10 gives OK (in consideration of the upstream cost) to the terminal 11. As a result, a path used for the flow from the terminal 10 to the terminal 11 (the flow 2) is determined and an available bandwidth is also determined. Allocation of 64 kbps is performed and this information is given to the VoIP application 13b. As a result, the VoIP application 13b of the terminal 11 determines that the codec must be changed and instructs the VOIP application 13a of the terminal 10 to change the codec through re-INVITE.

Since only the terminal 10 becomes the counterpart of the terminal 12, this situation is equivalent to that of the first embodiment. That is, combinations of the flow and the paths are generated for the communication with the terminal 10 (FIG. 38(B)) and one with the highest score (combination 1) is selected and transmitted to the terminal 10. The terminal 10 gives OK (in consideration of the upstream cost) to the terminal 12. As a result, a path used for the flow from the terminal 10 to the terminal 12 (the flow 2) is determined and an available bandwidth is also determined. Allocation of 64 kbps is performed and this information is given to the VoIP application 13c. As a result, the VoIP application 13c of the terminal 12 determines that the codec must be changed and instructs the VoIP application 13a of the terminal 10 to change the codec through re-INVITE.

As a result, the utilized paths and the bandwidths are determined for all the flows. For these utilized paths, packets are generated on the data transmission side and delivered to the counterpart terminal through the internet network. Therefore, a table is created for a packet generation rule. Each terminal has a packet generation rule for transmit packets. FIG. 39(A) shows a table created by terminal 10; FIG. 39(B) shows a table created by terminal 11; and FIG. 39(C) shows a table created by terminal 12. Since the terminals have these tables, appropriate packets are created for each flow, and outlet and inlet ports can appropriately be controlled. In this embodiment, a sign of OK is sent as the selected combination. That is, the selected combination is not necessarily the "combination" data.

(Fifth Embodiment)

Figure 40:
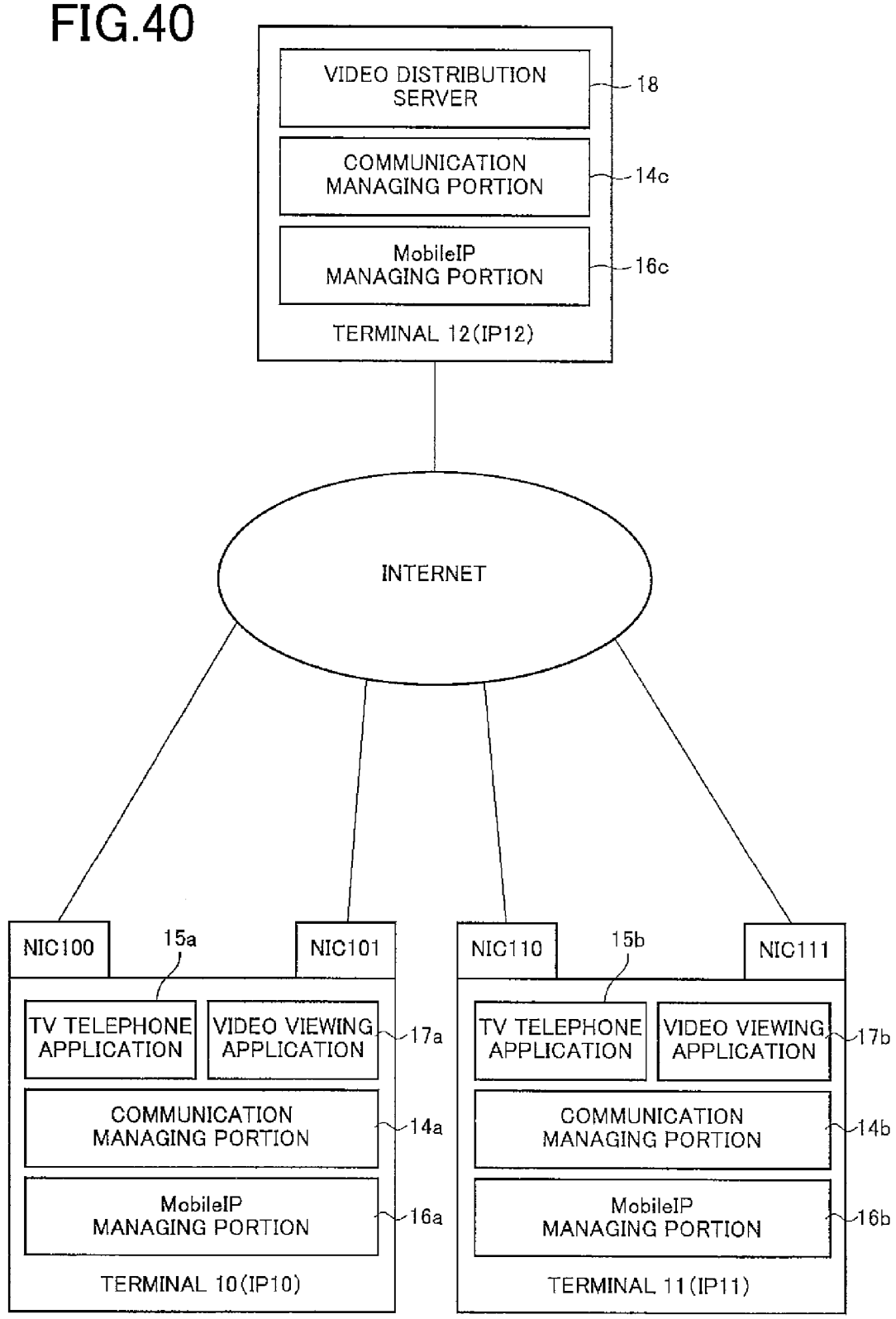
FIG. 40 is a typical view of a system configuration example for explaining a fifth embodiment of the present invention.

FIGS. 40 to 62 are views for explaining a fifth embodiment of viewing video streaming during a TV telephone call through transmission/reception among three or more terminals. For example, a grandchild and a grandfather watch a soccer game during a TV telephone call. The grandchild concentrates more on the soccer game than on the TV telephone call but the grandfather attaches more importance to the image quality of the TV telephone call. As shown in a typical view of a system configuration example of the fifth embodiment of FIG. 40, the terminal 10 comprises by the TV telephone application 15a, the video viewing application 17a, the communication managing portion 14a, and the MobileIP managing portion 16a. Similarly, the terminal 11 is configured by the TV telephone application 15b, the video viewing application 17b, the communication managing portion 14b, and the MobileIP managing portion 16b. The terminal 12 comprises the communication managing portion 14c and the MobileIP managing portion 16c.

Figure 41:
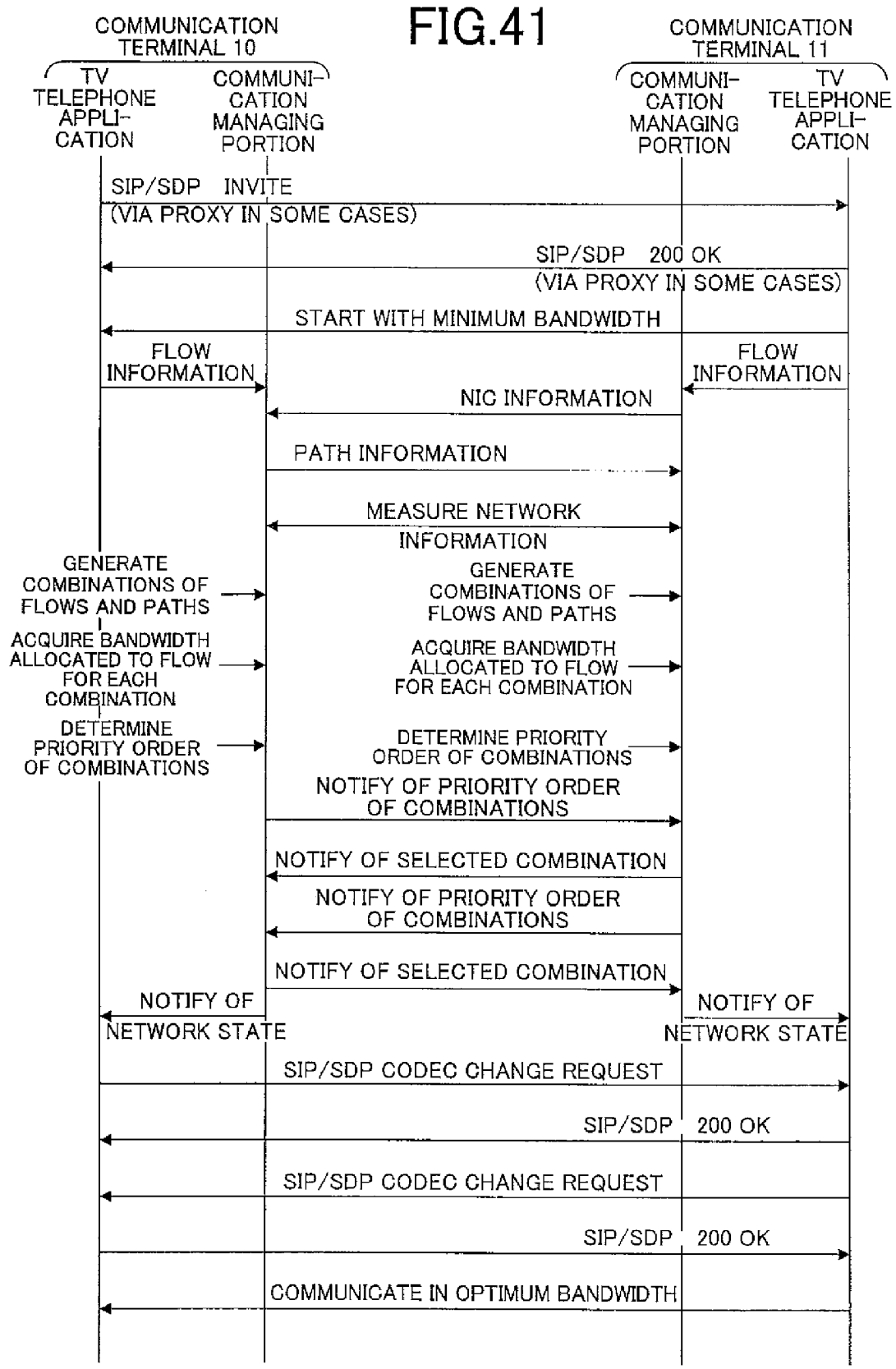
FIG. 41 is a sequence view (terminal 10 to terminal 11) of FIG. 40.
Figure 42:
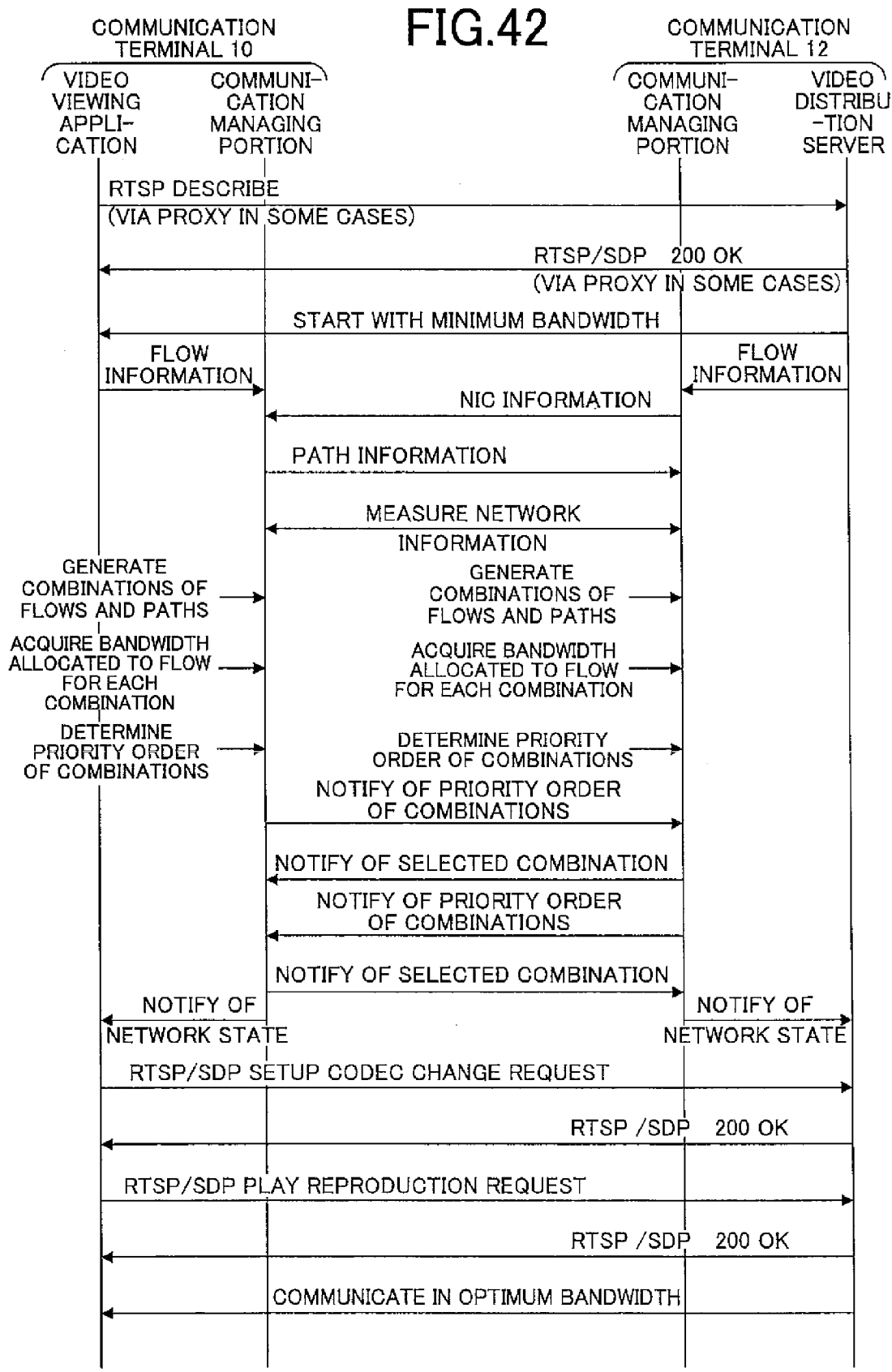
FIG. 42 is a sequence view (terminal 10 to terminal 12) of FIG. 40.
Figure 43:
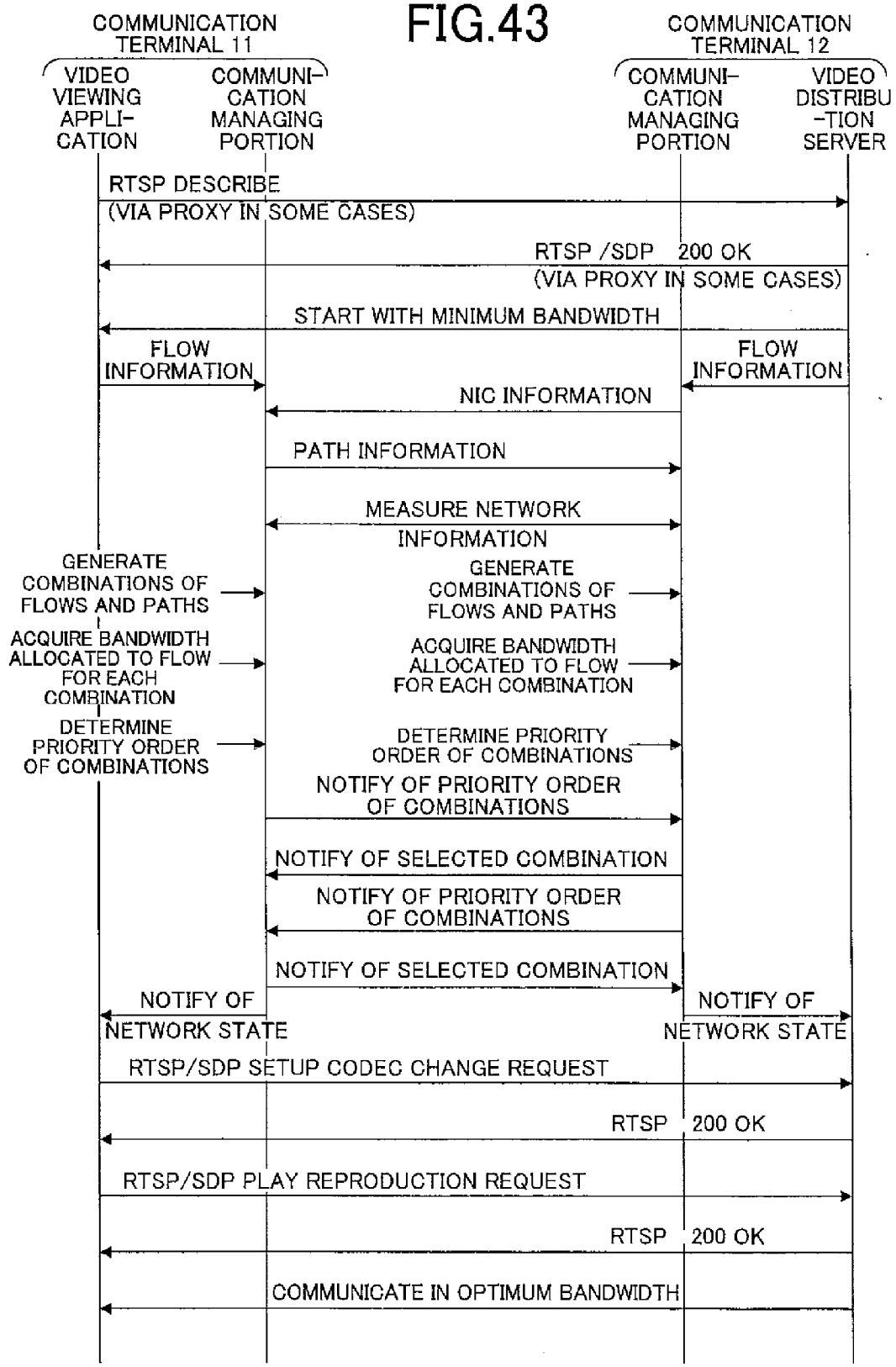
FIG. 43 is a sequence view (terminal 11 to terminal 12) of FIG. 40.

FIG. 41 shows a sequence of a TV telephone call between the terminal 10 and the terminal 11; FIG. 42 shows a sequence for the video distribution application between the terminal 10 and the terminal 12; FIG. 43 shows a video distribution sequence for the video distribution between the terminal 11 and the terminal 12. The sequences shown in FIGS. 41 to 43 are the same as those of the second embodiment shown in FIG. 9. That is, the applications and the communication between the communication managing portions do not have to be changed, and only an algorithm routine needs to be changed within the communication managing portions.

First, it is assumed that a grandchild has the terminal 10 and is watching a soccer game on the terminal 10. It is also assumed the grandchild has a TV telephone call from a grandfather who has the terminal 11. The video viewer already has flow information shown in FIG. 44 for the terminal 12 at this point. With regard to the flow 10-1, a destination IP address is IP10 (HoA); a source IP address is IP12 (normal IP address, the terminal 12 is CN); and a destination port is No. 9200. Three types of codecs are supported, which are 64 kbps, 1 Mbps, and 6 Mbps, and preference levels are 64 kbps for the at least necessary bandwidth, *2 for 1 Mbps, and *5 for 6 Mbps.

In the preference information for delay, the delay is preferred to be small and the preference level is *2, and the preference level of the downstream cost is *3. Although both the mobility and stability are preferred to be high, the preference level is *1 and shows that not much importance is attached to them preference information. Having a TV telephone call from the terminal 11 is equivalent to receiving an INVITE message of the SIP/SDP. The TV telephone application 15a of the terminal 10 generates the flow information from the SDP in the INVITE message and supplies the flow information to the communication managing portion 14a. This flow information is shown in FIG. 45.

FIG. 45 shows information of four flows. Describing in sequence, the flow 10-2 has IP10 as a destination address and IP11 as a source address and is, therefore, a flow from the terminal 11 to the terminal 10. Although a destination port is 7080 and this is an audio flow, what the application is makes no sense for the communication managing portion 14a, and it is important how the preference is set for this flow. It is also important what application this flow 10-2 is related to. That is, although it is important that this flow is a flow for the TV telephone call, whether audio or image of the TV telephone call is not important. The communication managing portion memorizes that the flow 10-2 is a flow for the TV telephone call. This identifier can be a PID or port number.

Referring to the preference, the at least necessary bandwidth is 8 kbps. Although this can be related with the utilized codec of the application, such as G729.1, the utilized codec makes no sense for the communication managing portion 14a and it is important how much bandwidth is necessary. In the preference of bandwidth, *5 is given to 64 kbps. Although this can be related, for example, with G711 Mu-low codec, however, this makes no sense for the communication managing portion 14a as described above. It is important that the preference of the preference level *5 is defined for the bandwidth of 64 kbps. A requirement for delay is the preference level of *4 and the cost is at the preference level of *0, which indicates no consideration. The mobility and the stability are at the preference level of *1.

The flow 10-3 has IP10 as a destination address and IP11 as a source address which are the same as in the case of the flow 10-2 and is, therefore, a flow from the terminal 11 to the terminal 10. Although a destination port is 9080 and this is a TV telephone image flow, what the application is makes no sense for the communication managing portion 14a, and it is important how the preference is set for this flow. The minimum bandwidth is 0 kbps, which means that no image is accepted; the preference level of 100 kbps is *3; and the preference level of 500 kbps is *2. The delay is at the preference level of *0 and is not considered; the cost (downstream) is at the preference level of *3; and the mobility and stability are at the preference level of *1. It is also important what application the flow 10-3 is related to. That is, although it is important that this flow is a flow for the TV telephone call, whether audio or image of the TV telephone call is not important. The communication managing portion memorizes that the flow 10-3 is a flow for the TV telephone call. This identifier can be a PID or port number.

The next flow 11-2 has IP11 as a destination address and IP10 as a source address and is, therefore, a flow from the terminal 10 to the terminal 11, which is an upstream flow in other words. Therefore, the preference exists only for the upstream cost and the preference level is *1. The flow 11-3 also is an upstream flow from the terminal 10 to the terminal 11, and the preference level of the upstream cost is set to *0, which indicates no consideration.

The communication managing portion 14a operates based on the above flow information. Paths (path 10-12-1, path 10-12-2) are already formed for the terminal 12. FIGS. 46(A) and 46(B) show the path information and the NIC information. The flow 10-1 is selected for these paths. It is assumed that the path 10-12-2 is currently used. Since new downstream flows (flow 10-2, flow 10-3) are added to this situation, the communication managing portion 14a must remap the flows to the paths.

Since no path exists between the terminal 10 and the terminal 11 at this point, a path is created. The terminal 10 transmits the NIC information to the terminal 11 and acquires the path information (path 10-11-1 to path 10-11-8). FIGS. 47(A) and 47(B) show the acquired path information and the NIC information. To complete the acquired figures, a network state is acquired (details of the acquiring method are omitted) As a result, FIG. 48(A) is acquired for terminal 10 and FIG. 48(B) is acquired for the terminal 11.

Figure 50:
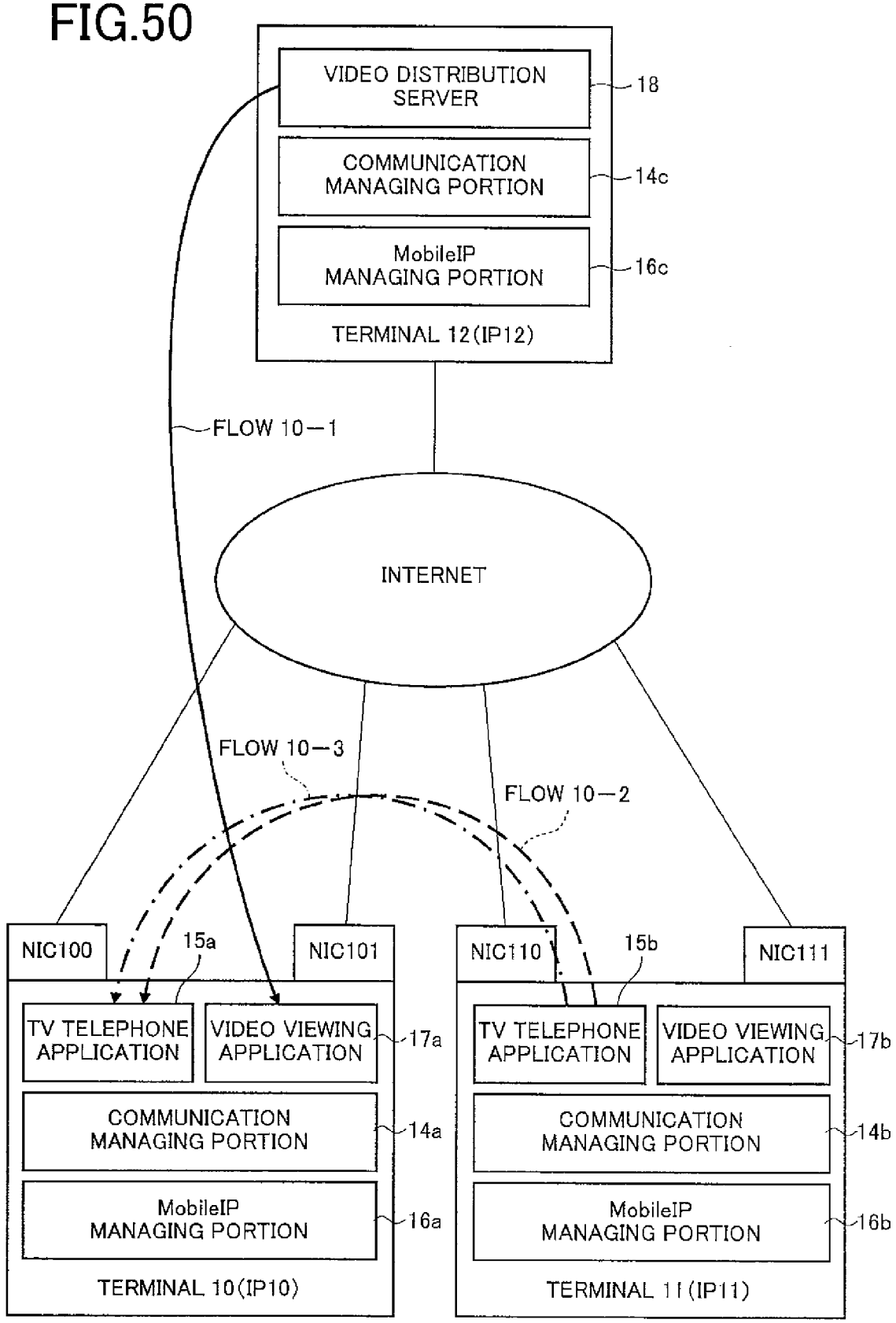
FIG. 50 is a view of a situation of the flow (terminal 10).

Since the pass information is acquired as above, the flows are mapped to the paths. It is presupposed that the flows are prioritized. The priorities may be determined in advance or the order may be determined from a GUI (Graphical User Interface), etc., in each case. FIG. 49(A) shows an example of the GUI. As a result, in the terminal 10, it is determined that the video streaming is the most important, the TV telephone audio is the next, and the lowest priority is given to the TV telephone image. FIG. 50 shows the appearance of a series of the flows.

In this embodiment, the paths are selected in order of priority from that for the video streaming with the highest priority. First, the flow 10-1 selects the path. On this occasion, it is assumed that the flow 10-1 has a right to occupy the half of the bandwidth (measured) of the path. Up to half is occupied because the sum of a geometric series of ½ (½+¼+ ⅛ . . . ) is one. A larger value of the half of the bandwidth (measured) and the bandwidth (Max) in the flow information is given to the flow as an allocated bandwidth.

The flow 10-1 selects a path from paths 10-12-1 and 10-12-2. Therefore, scores are calculated taking into account the bandwidths allocated when using the paths. The result is shown in FIG. 51(A). As a result, the flow 10-1 selects the path 10-12-2 and occupies a bandwidth of 6 Mbps. In this case, an available bandwidth in the path 10-12-2 is 20–6=14 Mbps.

The next flow 10-2 selects a path from paths 10-11-1 to 10-11-4. Although available bandwidths of the paths 10-11-1 to 10-11-4 may be affected because the flow 10-1 is mapped to the path 10-12-2 as above, it is assumed in this embodiment that the bandwidths are not affected. If affected, the available bandwidths are calculated in consideration of the effects, and a right to occupy the half of the remaining bandwidth is given. FIG. 51(B) shows scores of the paths taking into account the bandwidths allocated when the flow 10-2 selects each path (the paths 10-11-1 to 10-11-4). As a result, the flow 10-2 selects the path 10-11-2.

The next flow 10-3 selects a path from the paths 10-11-1 to 10-11-4. Since the flow 10-2 has already selected the path 10-11-2, the bandwidth of the path is narrowed. Considering this, scores calculated taking into account the available bandwidths when using each path as shown in FIG. 51(*c*). As a result, the flow 10-3 selects the path 10-11-13.

In this way, the utilized paths are determined for all the flows. Therefore, the communication managing portion 14*a* notifies the terminal 11 and the terminal 12 of the priority order of paths. The priority order of paths is assumed to be combinations of the flows and the paths as described above. First, with regard to the terminal 11, from combinations of two flows and four paths, i.e., 16 combinations, a combination including the flow 10-2 and the path 10-11-2 as well as the flow 10-3 and the path 10-11-1 is transmitted to the terminal 11. In this embodiment, only this combination is transmitted. The combination is shown in FIG. 52(A). To the terminal 12, from combinations of one flow and two paths, i.e., two combinations, a combination of the flow 10-1 selecting the path 10-12-2 is transmitted. The combination is shown in FIG. 52(B).

Since one combination is transmitted, the terminal 11 has no alternatives and only determines whether OK or NG. This is determined from the cost (upstream) in the path information (FIG. 48(B)). An upper limit is set for the cost and if the cost of the priority of the notified combination exceeds the limit, the combination is NG. In this embodiment, the combination including the flow 10-2 and the path 10-11-2 as well as the flow 10-3 and the path 10-11-1 is transmitted Lo the terminal 10 as the selected combination determined as OK. Since this combination is selected, the terminal 11 can generate a transmission packet generation rule. FIG. 53(A) shows the rule of transmission packets.

The rule shown in FIG. 53(A) is the rule that, a packet of the flow having the source HoA of IP11, the destination HoA of IP10, and the destination port of 7080 uses NIC111 as the source communication medium, IP111 as the source CoA, and IP100 as the destination CoA. The rule shown on the bottom of FIG. 53(A) is the rule that, a packet of the flow having the source HoA of IP11, the destination HoA of IP10, and the destination port of 9080 uses NIC110 as the source communication medium, IP110 as the source CoA, and IP100 as the destination CoA. In accordance with this rule, the MobileIP managing portion 16*b* of the terminal 11 generates suitable packets.

Since one combination is transmitted, the terminal 12 has no alternatives and only determines whether OK or NG. Since the terminal 12 is a video distribution server and the cost is not taken into account, the combination is determined as OK. As a result, the terminal 10 is notified of the path 10-12-2 for the flow 10-1 as the selected combination. Since this combination is determined, the terminal 12 determines a transmission packet generation rule. In this rule, as shown in FIG. 53(B), a packet having the destination HoA of IP10, the source HoA of IP12, and the destination port of 9200 uses NIC120 as the source communication medium, IP12 as the source CoA, and IP101 as the destination CoA. In accordance with this rule, the MobileIP managing portion 16*c* of the terminal 12 generates suitable packets.

The terminal 10 is notified of the selected combination from the terminal 11. Based on this notification, the terminal 10 notifies the TV telephone application 15*a* of the network state (FIG. 54(A)). This network state means that the flow having the destination HoA of IP10, the source HoA of IP11, and the destination port of 7080 has the allocated bandwidth of 64 kbps, the stability of B, the cost of 4, and the RTT delay difference of 0, and that the flow having the destination HoA of IP10, the source HoA of IP11, and the destination port of 9080 has the allocated bandwidth of 500 kbps, the stability of A, the cost of 2, and the RTT delay difference of 50. The network state of this notification is supplied to the TV telephone application since the communication managing portion grasps the fact that the flow 10-2 and the flow 10-3 are flows of the TV telephone. The TV telephone application 15*a* receives this notification and transmits SIP/SDP re-INVITE Receive Only to the TV telephone application 15*b* of the terminal 11 for changing the codec to be used. The terminal 11 transmits 200 OK to the terminal 10.

The terminal 10 is notified of a utilized combination from the terminal 12 in addition to the communication with the terminal 11. Based on this notification, the terminal 10 notifies the video viewing application 17*a* of the network state. This network state is shown in FIG. 54(B). This means that the flow having the destination HoA of IP10, the source HoA of IP12, and the destination port of 9200 has the allocated bandwidth of 6 Mbps, the stability of A, the cost of 5, and the RTT delay difference of 50. The network state of this notification is supplied to the video application since the communication managing portion grasps the fact that the flow 10-1 is a flow of the video application.

Based on this information, the video viewing application 17*a* of the terminal 10 notifies the video distribution server 18 of the terminal 12 of the timing of the codec change and the codec type after the change through RTSP SETUP. The video distribution server 18 accepts the request and notifies the video viewing application of the communication terminal 10 of 200 OK. This terminates the optimization of the downstream flow to the terminal 10. As a result, the grandchild can watch the video viewing application 17*a* of a soccer game through the path 10-12-2 in the quality of 6 Mbps and can utilizes the TV telephone application 15*a* for the audio in the quality of 64 kbps through the path 10-11-2 and for the images in the quality of 500 kbps through the path 10-11-1.

The operation of the terminal 11 will be described. With the terminal 11, the grandfather makes a TV telephone call to the grandchild. This is realized by notifying the terminal 10 of INVITE of the SIP/SDP, and receiving the telephone call by the grandchild means that SIP/SDP 200 OK is returned to the terminal 11. The TV telephone application 15*b* of the terminal 11 receives SIP/SDP 200 OK and generates flow information based on the information. The TV telephone call is connected on the minimum condition (8-kbps audio, no image) at this point. Viewing video is then manually requested from the grandfather. As a result, the flow information is acquired through exchanges of RTSP between the video viewing application 17*b* of the terminal 11 and the video distribution server 18 of the terminal 12.

To the communication managing portion 14*b* of the terminal 11, the TV telephone application 15*b* gives the flow information (FIG. 55(A)) related to the TV telephone call and the video viewing application 17*b* gives the flow information (FIG. 55(B)) related to viewing video. The feature of the flow information includes that all the costs have the preference level of *0 in the flow information of the TV telephone call, and the higher quality is preferred in this setting. In this preference, the cost of the TV telephone call with the grandchild is not taken into consideration and the higher quality is preferred. On the other hand, with regard to the video viewing, the higher quality is not so much preferred and the cost is prioritized in this setting.

Details of the flow information will hereinafter be described. For the flow 10-2 that is the upstream audio flow of the TV telephone call and the flow 10-3 that is the upstream image flow of the TV telephone call, the preference level of the cost is set to *0, i.e., no consideration. In the preference for the flow 11-2 that is the downstream audio flow of the TV telephone call, at least 8 kbps is necessary; the preference level of 64-kbps codec is *5; the delay difference is preferred to be small and has the preference level of *4; the cost is not considered; the stability has the preference level of *2; and the mobility has the preference level of *1.

In the preference for the flow 11-3 that is the image flow of the TV telephone call, no image is accepted; the preference level of 100-kbps codec is *1; the preference level of 500-kbps codec is *7; the delay difference is preferred to be small and has the preference level of *2; the cost is not considered; the stability has the preference level of *2; and the mobility has the preference level of *1. In the preference for the flow 11-1 that is the flow for viewing video, at least 64 kbps is necessary; the preference level of 1-Mbps codec is *1; the preference level of 6-Mbps codec is *1; the delay difference is preferred to be small and has the preference level of *1; the preference level of the cost is *6; the stability has the preference level of *1; and the mobility has the preference level of *1.

The communication managing portion 14*b* of the terminal 11 acquires the above flow information and generates the paths to the terminals 10 and 12. The path to the terminal 10 is as described above and will not be described. The path to the terminal 12 must be generated. The terminal 11 transmits the own communication medium information (FIG. 56(A)) to the terminal 12. The terminal 12 generates the path and transmits the path information (FIG. 56(A)) and the communication medium information (FIG. 56(C)).

Figure 57:
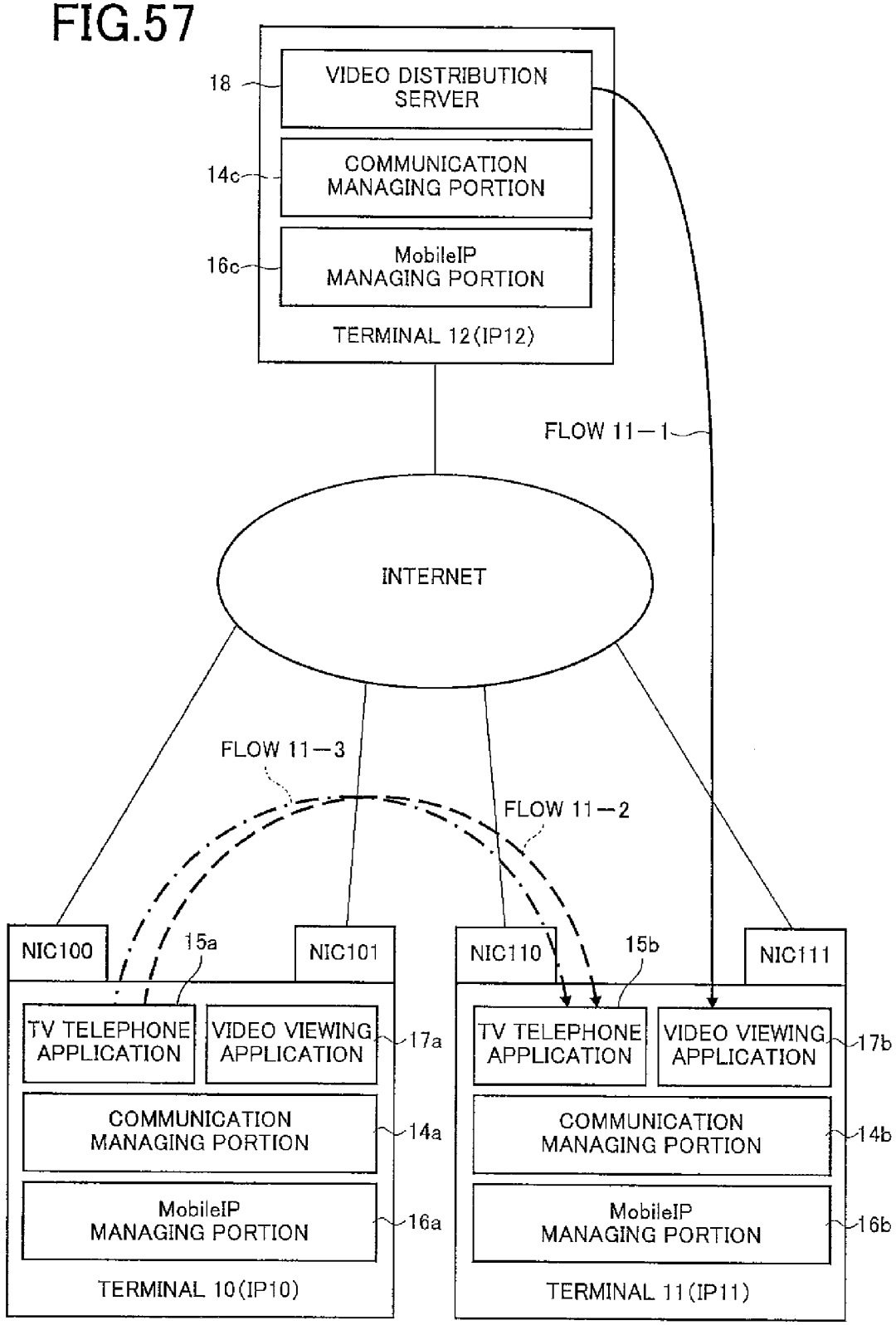
FIG. 57 is a view of a situation of the flow (terminal 11).

Since the flow information and the path information are acquired, the terminal 11 selects an optimum combination. The flows are prioritized in the terminal 10 at this point as shown in FIG. 49(A). In this case, the GUI such as shown in FIG. 49(B) is used to select an order defining the TV telephone video as the first, the TV telephone audio as the second, and the video viewing as the third. Therefore, the TV telephone video, i.e., the flow 11-3 first selects the path. FIG. 57 shows the appearance of a series of the flows.

The flow 11-3 selects a path from paths 10-11-5 to 10-11-8. As described above, scoring is performed including the bandwidths available when using the paths. The result is shown in FIG. 58(A). As a result, the path 10-11-5 is selected for the TV telephone image and 500 kbps are allocated. In this embodiment, considerations are given to the lower order. First, the path 10-11-5 is a path using the communication medium NIC100 of the terminal 10, which is the counterpart. Since the path may be refused by the counterpart due to the preference for the cost, it is determined which of the path 10-11-6 and the path 10-11-8 is better when using the NIC101. In this determination, the path 10-11-8 is selected because of the score.

A path is then selected by the flow 11-2 that is the TV telephone audio flow. The flow 11-2 selects a path from paths 10-11-5 to 10-11-8. As described above, scoring is performed including the bandwidths available when using the paths. The result is shown in FIG. 58(B). As a result, the path 10-11-8 is selected for the TV telephone audio and 64 kbps are allocated. As described above, considerations are given to the lower order. In the same manner as the above case, since the path 10-11-8 uses the NIC101 of the terminal 10, a path is selected from the paths 10-11-5 and 10-11-7 using the NIC100. As a result, the path 10-11-5 is selected.

Finally, a path is selected by the flow 11-1 that is the video viewing flow. The flow 11-1 selects a path from paths 10-12-1 to 10-12-2. In the same manner as described above, scoring is performed including the bandwidths available when using the paths. The result is shown in FIG. 58(C). As a result, the path 10-12-1 is selected for the video viewing flow and 1 Mbps are allocated. Although 6-Mbps flow can be acquired if the path 11-12-2 is selected, the low-price 1-Mbps path is selected for watching a soccer game since the preference for the cost is high.

The terminal 11 generates the priority order (FIG. 59(A)) of combinations of flows related to the TV telephone call for the terminal 10. The first priority is given to the "combination 1", which is selected without giving consideration to the counterpart (the terminal 10). Considerations are given to combinations having the limited counterpart NIC. That is, considerations are given to the "combination 2" using only the NIC100 and the "combination 3" using only the NIC101. With regard to the two combinations, the "combination 2" has a higher score and a higher combination priority. This combination is transmitted to the terminal 10. With regard to the video viewing, the priority order (FIG. 59(B)) of combinations is generated for the terminal 12.

The terminal 10 adds the own preference information of the upstream cost to the acquired priority order to select the utilized combination. FIG. 60(A) shows a result after adding the upstream scores. As a result, the "combination 1" is selected as the selected combination and the priority order of combination shown in FIG. 60(B) is transmitted to the terminal 11. Since a rule for transmit packets to the terminal 11 is determined in the terminal 10 at this point, the MobileIP managing portion 16*a* is notified of the information shown in FIG. 61(A).

In the setting of the upper side of FIG. 61(A), the flow having the source HoA of IP10 the destination HoA of IP11, and the destination port of 7080 uses IP101 as the source CoA and IP111 as the destination CoA from NIC101 as the source communication medium. In the setting of the lower side, the flow having the source HoA of IP10, the destination HoA of IP11, and the destination port of 9080 uses IP100 as the source CoA and IP110 as the destination CoA from NIC100 as the source communication medium. As a result of these settings, the path 10-11-8 can be used for the flow 11-2 and the path 10-11-5 can be used for the flow 11-3.

The communication managing portion 14*b* of the terminal 11 receives the utilized combination determined by the terminal 10. As a result, bandwidths can be allocated to the flows 11-2 and 11-3. The communication managing portion 14*b* notifies the TV telephone application 15*b* of the network state (FIG. 61(B)). The upper side of FIG. 61(B) means that the flow having the source IP address of IP10, the destination IP address of IP11, and the destination port of 7080 has the allocated bandwidth of 64 kbps, the stability of B, the cost of 1, and the RTT delay difference of 0. In the same manner as described in the case with the terminal 10, the communication managing portion grasps this network state, and the network state is given to a suitable application.

The lower side means that the flow having the source IP address of IP10, the destination IP address of IP11, and the destination port of 9080 has the allocated bandwidth of 500 kbps, the stability of A, the cost of 3, and the RTT delay difference of 90. The TV telephone application 15b of the terminal 11 acquires these pieces of information and requests the TV telephone application 15a of the terminal 10 to change the codec through SIP/SDP Re-INVITE Receive Only. The TV telephone application of the terminal 10 returns SIP/SDP 200 OK Send Only to change the codec. This leads to the completion of a series of settings for the TV telephone call.

The terminal 11 performs exchange with the terminal 12 in parallel with the above exchange. The terminal 11 transmits the combination shown in FIG. 59(B) to the terminal 12. Since the terminal 12 has only one communication medium, one combination is presented without presenting a plurality of candidates. The terminal 12 receives the combination shown in FIG. 59(B), determines that the combination is OK, and returns the combination shown in FIG. 59(B) as the selected combination without any change. As a result, since the rule for packets is determined in the terminal 12, the MobileIP managing portion 16c is notified of the information shown in FIG. 62(A). In this setting, the flow having the source HoA of IP12, the destination HoA of IP11, and the destination port of 9200 uses IP12 as the source IP address and IP101 as the destination CoA from NIC120 as the source communication medium.

The communication managing portion 14b of the terminal 11 receives the utilized combination from the terminal 12 and notifies the video viewing application 17b of the network state (FIG. 62(B)). The video viewing application of the terminal 11 receives the network state and requests to change the codec through RTSP/SDP Setup. The video distribution serve of the terminal 12 correspondingly returns 200 OK.

The above transmitting/receiving method according to the present invention is executed by a computer equipped in a communication terminal. Therefore, a program is used which indicates procedures of executing transmission/reception of data between various applications and communication managing portions as well as transmission/reception between the communication terminals through various communication media. Transmission/reception according to the present invention can be executed with the use of a computer readable recording medium having stored thereon the above described program.

The invention claimed is:

1. A transmitting/receiving method of selecting a combination of flows and paths when transmitting/receiving one or more flows through one or more paths among a plurality of communication terminals, the plurality of communication terminals including a first communication terminal and a second communication terminal, where each of the plurality of communication terminals has a communication managing portion, the method comprising the steps of:
delivering flow information including at least address information and preference information on a network to a first communication managing portion by an application in the first communication terminal;
transmitting communication medium information included in the first communication terminal to the second communication terminal based on the flow information of the first communication managing portion of the first communication terminal;
delivering flow information including at least address information and preference information on a network to a second communication managing portion by an application in the second communication terminal;
generating path information from the communication medium information received from the first communication terminal and communication medium information included in the second communication terminal and transmitting the path information to the first communication terminal by the second communication managing portion of the second communication terminal;
generating combinations for mapping flows to paths from the flow information and the path information included in each of the first communication terminal and the second communication terminal and transmitting a score of each combination by the communication managing portion of each of the first communication terminal and the second communication terminal;
performing setting such that the first communication managing portion of the first communication terminal selects the combination having a higher score including preference information of the first communication terminal to use a path for each data flow to enable a path to be selected for each flow; and
performing setting such that the second communication managing portion of the second communication terminals selects a combination having a higher score including preference information of the second communication terminal to use a path for each data flow to enable a path to be selected for each flow.

2. The transmitting/receiving method as defined in claim 1, wherein the preference information includes one or more pieces of request bandwidth information corresponding to contents available to the application of the respective communication terminal.

3. The transmitting/receiving method as defined in claim 2, wherein the request bandwidth information includes one or more pieces of request bandwidth information represented by numeric values and preference levels represented by numeric values respectively corresponding thereto.

4. The transmitting/receiving method as defined in claim 1, wherein the preference information includes delay difference information.

5. The transmitting/receiving method as defined in claim 4, wherein the delay difference information includes a preference level represented by a numeric value.

6. The transmitting/receiving method as defined in claim 1, wherein the preference information includes charge information.

7. The transmitting/receiving method as defined in claim 6, wherein the charge information includes a preference level represented by a numeric value.

8. The transmitting/receiving method as defined in claim 7, wherein the charge information has separate preference levels for upstream and downstream.

9. The transmitting/receiving method as defined in claim 1, wherein the preference information includes information of a packet loss rate per unit time.

10. The transmitting/receiving method as defined in claim 9, wherein the infatuation of a packet loss rate per unit time includes a preference level represented by a numeric value.

11. The transmitting/receiving method as defined in claim 1, wherein the preference information includes cell information of a wireless communication medium.

12. The transmitting/receiving method as defined in claim 11, wherein the cell information of a wireless communication medium includes a preference level represented by a numeric value.

13. A communication system having a plurality of communication terminals wherein the plurality of communication terminals includes a first communication terminal having a first communication managing portion and a second communication terminal having a second communication managing portion, the communication system comprising:
the first communication terminal, where an application in the first communication terminal delivers flow information including at least address information and preference information to the first communication managing portion of the first communication terminal;
the second communication terminal, where an application in the second communication terminal delivers flow information including at least address information and preference information to the second communication managing portion of the second communication terminal;
the first communication managing portion of the first communication terminal transmits communication medium information included in the first communication terminal to the second communication terminal based on the flow information; and
the second communication managing portion of the second communication terminal generates path information from the received communication medium information included in the first communication terminal and communication medium information included in the second communication terminal and the second communication managing portion of the second communication terminal transmits the path information to the first communication terminal, wherein
the first communication managing portion of the first communication terminal and the second communication managing portion of the second communication terminal each generate combinations for mapping flows to paths from the flow information and the path information included in each of the first communication terminal and the second communication terminal and transmits a score of each combination, and
the first communication managing portion of the first communication terminal and the second communication managing portion of the second communication terminal each select a combination having a higher score including preference information of the respective communication terminal to use a path for each data flow to enable a path to be selected for each flow.

14. A non-transitory computer-readable medium having instructions stored thereon, such that when the instructions are read and executed by two processors, the two processors are configured to perform the steps of:
delivering flow information including at least address information and preference information on a network to a first communication managing portion by an application in a first communication terminal;
transmitting communication medium information included in the first communication terminal to a second communication terminal based on the flow information of the first communication managing portion of the first communication terminal;
delivering flow information including at least address information and preference information on a network to a second communication managing portion by an application in the second communication terminal;
generating path information from the communication medium information received from the first communication terminal and communication medium information included in the second communication terminal and transmitting the path information to the first communication terminal by the second communication managing portion of the second communication terminal;
generating combinations for mapping flows to paths from the flow information and the path information included in each of the first communication terminal and the second communication terminal and transmitting a score of each combination by the communication managing portion of each of the first communication terminal and the second communication terminal;
performing setting such that the first communication managing portion of the first communication terminal selects a combination having a higher score including preference information of the first communication terminal to use a path for each data flow to enable a path to be selected for each flow; and
performing setting such that the second communication managing portion of the second communication terminals selects a combination having a higher score including preference information of the second communication terminal to use a path for each data flow to enable a path to be selected for each flow.

15. The non-transitory computer-readable medium according to claim 14, wherein the preference information includes one or more pieces of request bandwidth information corresponding to contents available to the application.

16. The non-transitory computer-readable medium according to claim 14, wherein the preference information includes delay difference information.

17. The non-transitory computer-readable medium according to claim 14, wherein the preference information includes charge information.

18. The non-transitory computer-readable medium according to claim 14, wherein the preference information includes information of a packet loss rate per unit time.

* * * * *

UNITED STATES PATENT AND TRADEMARK OFFICE
CERTIFICATE OF CORRECTION

PATENT NO.         : 8,165,022 B2
APPLICATION NO.    : 11/915714
DATED              : April 24, 2012
INVENTOR(S)        : Suguru Toyokawa et al.

It is certified that error appears in the above-identified patent and that said Letters Patent is hereby corrected as shown below:

ON THE TITLE PAGE:

At item (75), Inventors, change "Hisao Kumia, Ichikawa (JP)" to --Hisao Kumai, Ichikawa (JP)--.

Signed and Sealed this
Seventh Day of August, 2012

David J. Kappos
*Director of the United States Patent and Trademark Office*